(12) United States Patent
Motoyama et al.

(10) Patent No.: US 11,427,218 B2
(45) Date of Patent: Aug. 30, 2022

(54) CONTROL APPARATUS, CONTROL METHOD, PROGRAM, AND MOVING BODY

(71) Applicant: Sony Corporation, Tokyo (JP)

(72) Inventors: Takuto Motoyama, Tokyo (JP); Hideki Oyaizu, Tokyo (JP); Yasuhiro Sutou, Kanagawa (JP); Toshio Yamazaki, Tokyo (JP); Kentaro Doba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 306 days.

(21) Appl. No.: 16/634,581

(22) PCT Filed: Jul. 25, 2018

(86) PCT No.: PCT/JP2018/027841
§ 371 (c)(1),
(2) Date: Jan. 28, 2020

(87) PCT Pub. No.: WO2019/026715
PCT Pub. Date: Feb. 7, 2019

(65) Prior Publication Data
US 2020/0231176 A1 Jul. 23, 2020

(30) Foreign Application Priority Data
Aug. 4, 2017 (JP) .............................. JP2017-151477

(51) Int. Cl.
*B60W 60/00* (2020.01)
*G01S 17/931* (2020.01)
(Continued)

(52) U.S. Cl.
CPC ......... *B60W 60/001* (2020.02); *G01S 7/4814* (2013.01); *G01S 7/4816* (2013.01);
(Continued)

(58) Field of Classification Search
CPC .. B60W 60/001; G01S 7/4814; G01S 7/4816; G01S 17/42; G01S 17/894; G01S 17/931;
(Continued)

(56) References Cited

U.S. PATENT DOCUMENTS

2011/0026833 A1* 2/2011 Sugino ................. G06K 9/6289
348/46
2012/0268602 A1* 10/2012 Hirai ....................... G06T 7/136
348/148
(Continued)

FOREIGN PATENT DOCUMENTS

| JP | 2006-260105 A | 9/2006 |
| JP | 2009-110250 A | 5/2009 |
| JP | 2013-222446 A | 10/2013 |

OTHER PUBLICATIONS

International Search Report and Written Opinion dated Oct. 23, 2018 for PCT/JP2018/027841 filed on Jul. 25, 2018, 6 pages including English Translation of the International Search Report.

*Primary Examiner* — Elaine Gort
*Assistant Examiner* — Ellis B. Ramirez
(74) *Attorney, Agent, or Firm* — Xsensus LLP

(57) ABSTRACT

A laser range finder projects light while changing a direction in a horizontal direction at a predetermined angle with respect to a vertical direction to also receive reflected light of the light, and detects a direction and a distance in which the light is reflected from an obstacle or the like, according to a difference time between a time of light projection and a time of light reception. A normal direction of a flat plane forming a road surface is detected on the basis of a polarized image. The laser range finder projects light such that the light has a predetermined angle with respect to the vertical direction so as to be orthogonal to the normal direction of the
(Continued)

flat plane forming the road surface. The laser range finder can be applied to in-vehicle systems.

15 Claims, 17 Drawing Sheets

(51) Int. Cl.
  *G01S 17/894* (2020.01)
  *G01S 7/481* (2006.01)
  *G01S 17/42* (2006.01)
  *G05D 1/00* (2006.01)

(52) U.S. Cl.
  CPC ............ *G01S 17/42* (2013.01); *G01S 17/894* (2020.01); *G01S 17/931* (2020.01); *G05D 1/0088* (2013.01); *G05D 2201/0213* (2013.01)

(58) Field of Classification Search
  CPC ........ G01S 7/4972; G01S 17/86; G01S 17/89; G05D 1/0088; G05D 2201/0213; G08G 1/166; G06T 7/73; G06T 7/521; G01C 21/28
  USPC ........ 701/26, 301; 250/341.3; 359/301, 303, 359/304; 382/103, 104, 236
  See application file for complete search history.

(56) References Cited

U.S. PATENT DOCUMENTS

2017/0018087 A1* 1/2017 Yamaguchi ............ G01C 21/28
2017/0131718 A1* 5/2017 Matsumura .......... A01B 69/008

* cited by examiner

CONTROL APPARATUS, CONTROL METHOD, PROGRAM, AND MOVING BODY

CROSS-REFERENCE TO RELATED APPLICATIONS

The present application is based on PCT filing PCT/JP2018/027841, filed Jul. 25, 2018, which claims priority to JP 2017-151477, filed Aug. 4, 2017, the entire contents of each are incorporated herein by reference.

TECHNICAL FIELD

The present disclosure relates to a control apparatus, a control method, a program, and a moving body, and particularly to a control apparatus, a control method, a program, and a moving body enabled to appropriately detect an obstacle in a movable region.

BACKGROUND ART

In order to implement autonomous movement of a moving body, it is necessary for the moving body to recognize a self-position. Therefore, a technology for recognizing a situation around oneself and generating a local map around oneself to estimate one's self-position has been proposed.

For example, there has been proposed a technology that, when generating a local map around oneself, quantifies the position and distance of an obstacle and generates a local map, using a horizontal scan type laser range finder that causes a laser in a light projection direction to scan in a direction orthogonal to an advancing direction (see Patent Document 1).

CITATION LIST

PATENT DOCUMENT

Patent Document 1: Japanese Patent Application Laid-Open No. 2009-110250

SUMMARY OF THE INVENTION

Problems to be Solved by the Invention

However, when the position and distance of an obstacle are quantified while the light projection direction of the laser range finder is rotated in a horizontal direction, in a case where the light projection direction of the laser is swung up and down in a vertical direction due to, for example, vibration of a moving body on which the laser range finder is mounted, a road surface is sometimes erroneously detected as an obstacle if the light projection direction of the laser is swung to the side of the road surface. Furthermore, when the light projection direction of the laser is swung upward, there is a possibility of bringing about a state in which, even if an obstacle is present on the road surface, the laser is not projected on the obstacle and the obstacle fails to be detected.

The present disclosure has been made in view of such a situation and, in particular, aims to enable appropriate detection of an obstacle using a laser range finder.

Solutions to Problems

A control apparatus according to one aspect of the present disclosure is a control apparatus including: an object detection unit that projects light while changing a direction along a same plane to also receive reflected light of the light, and detects a direction and a distance in which the light is reflected, according to a difference time between a time of light projection and a time of light reception; and a movable region normal detection unit that detects a normal direction of a flat plane in a three-dimensional space forming a movable region of a moving body, in which the object detection unit controls a light projection direction of light so as to change a direction along a plane orthogonal to the normal direction.

A polarization camera that captures polarized images with a plurality of polarization directions is allowed to be further included, and the movable region normal detection unit can be caused to detect a normal direction of a flat plane forming a movable region of a moving body, from the polarized images.

A normal direction detection unit that detects a normal direction of a surface of a subject in the polarized images in units of pixels, and outputs the detected normal direction as a normal map; a reconfiguration unit that reconfigures a non-polarized image from a plurality of the polarized images; and an attribute setting unit that determines, for each pixel of the non-polarized image, whether or not the subject has an attribute of the movable region are allowed to be further included, and the movable region normal detection unit can be caused to detect, as a normal direction of a flat plane forming the movable region, the normal direction dominant in a region of a pixel whose attribute is set as the movable region by the attribute setting unit among the pixels of the non-polarized image.

The attribute setting unit can be caused to set an attribute of the subject as the movable region for each pixel of the non-polarized image whose absolute value of an inner product of a perpendicular direction and a normal vector that has been detected is greater than a predetermined value.

An environment mapping unit that generates an environment map on the basis of information on the direction and the distance in which the light is reflected, which are detected by the object detection unit, is allowed to be further included.

The environment mapping unit can be caused to generate an environment map on the basis of information on whether or not each pixel of the non-polarized image has an attribute of the movable region, and information on the direction and the distance in which the light is reflected.

The environment mapping unit can be caused to generate the environment map by, for a direction in which each pixel of the non-polarized image is not in the movable region, and the reflected light is detected, setting a space up to reaching a distance at which the reflected light is detected, as a free space; setting a space in a vicinity of the distance at which the reflected light is detected, as a region indicating that an obstacle is highly likely to be present; and setting a space after the distance at which the reflected light is detected, as an unknown region, and for a direction in which each pixel of the non-polarized image is in the movable region, and the reflected light is detected, setting a space up to the distance at which the reflected light is detected, as a free space; and setting a space after the distance at which the reflected light is detected, as an unknown region.

The environment map is allowed to include an occupancy grid map.

A coordinate system integration unit that integrates a coordinate system indicating a position whose distance is detected by the object detection unit into a coordinate system of the polarized images captured by the polarization camera is allowed to be further included.

The object detection unit is allowed to include light detection and ranging or laser imaging detection and ranging (LiDAR).

The movable region is allowed to include a road surface.

A control method according to one aspect of the present disclosure is a control method including: projecting light while changing a direction along a same plane to also receive reflected light of the light, and detecting a direction and a distance in which the light is reflected, according to a difference time between a time of light projection and a time of light reception; and detecting a normal direction of a flat plane in a three-dimensional space forming a movable region of a moving body, on the basis of a polarized image, in which, in the detecting a direction and a distance in which the light is reflected, a light projection direction of light is controlled so as to change a direction along a plane orthogonal to the normal direction.

A program according to one aspect of the present disclosure is a program for causing a computer to execute a process including: an object detection unit that projects light while changing a direction along a same plane to also receive reflected light of the light, and detects a direction and a distance in which the light is reflected, according to a difference time between a time of light projection and a time of light reception; and a movable region normal detection unit that detects a normal direction of a flat plane in a three-dimensional space forming a movable region of a moving body, on the basis of a polarized image, in which the object detection unit controls a light projection direction of light so as to change a direction along a plane orthogonal to the normal direction.

A moving body according to one aspect of the present disclosure is a moving body including: an object detection unit that projects light while changing a direction along a same plane to also receive reflected light of the light, and detects a direction and a distance in which the light is reflected, according to a difference time between a time of light projection and a time of light reception; a movable region normal detection unit that detects a normal direction of a flat plane in a three-dimensional space forming a movable region of the moving body, on the basis of a polarized image; an environment mapping unit that generates an environment map on the basis of information on the direction and the distance in which the light is reflected, which are detected by the object detection unit; a planning unit that generates an action plan on the basis of the environment map; and a control unit that controls a motion of the moving body on the basis of the generated action plan, in which the object detection unit controls a light projection direction of light so as to change a direction along a plane orthogonal to the normal direction.

In one aspect of the present disclosure, light is projected while a direction is changed in a horizontal direction at a predetermined angle with respect to a vertical direction such that reflected light of the light is also received; a direction and a distance in which the light is reflected is detected according to a difference time between a time of light projection and a time of light reception; a normal direction of a flat plane forming a movable region of a moving body is detected on the basis of a polarized image; and the predetermined angle with respect to the vertical direction, in which the light is projected, is controlled so as to be orthogonal to the normal direction.

Effects of the Invention

According to one aspect of the present disclosure, it becomes possible to appropriately detect an obstacle, in particular, using a laser range finder.

MODE FOR CARRYING OUT THE INVENTION

Figure 1:
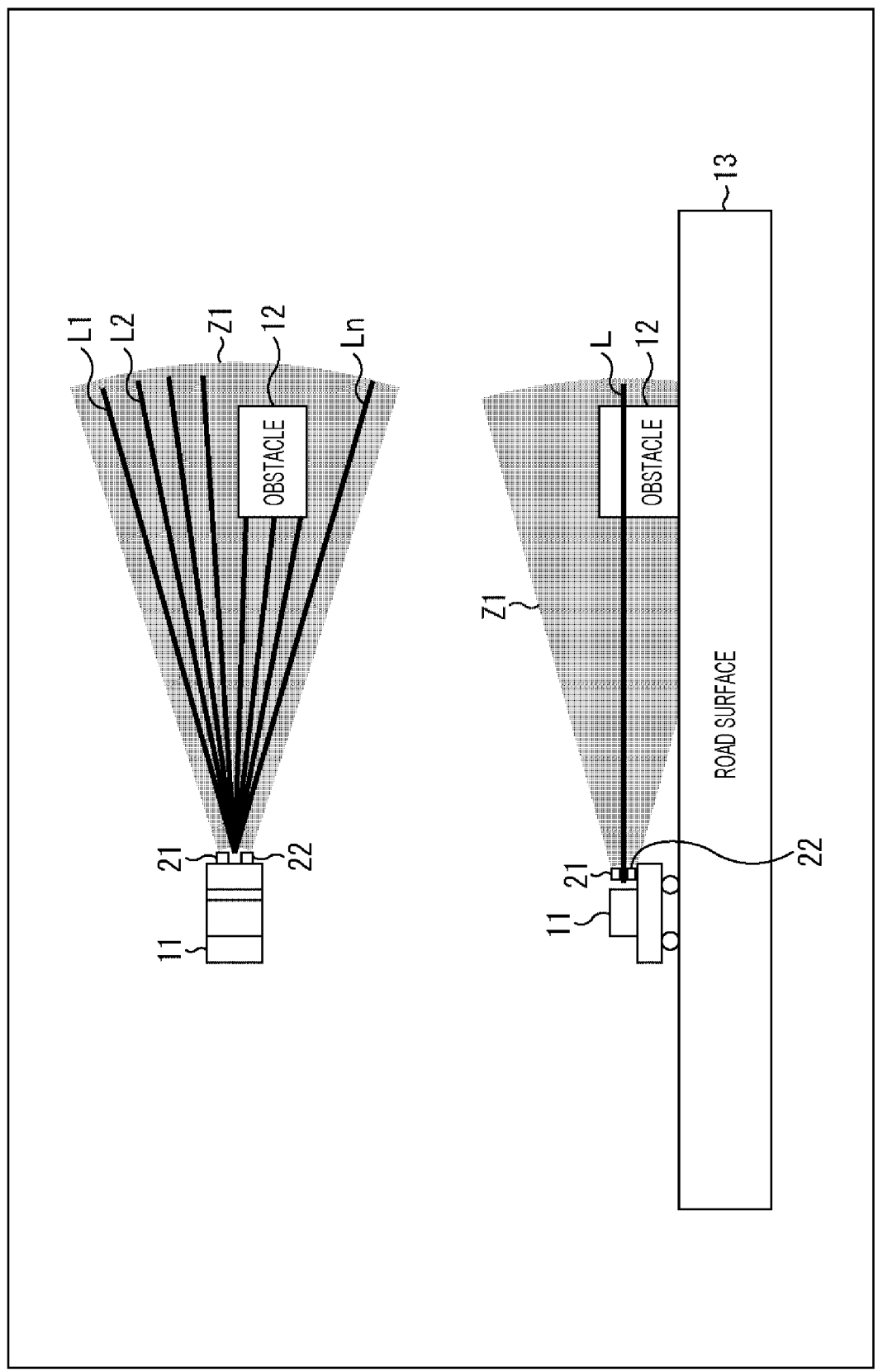
FIG. 1 is a diagram for explaining a method of detecting an obstacle using a laser range finder.

Hereinafter, favorable embodiments of the present disclosure will be described in detail with reference to the accompanying drawings. Note that, in the present description and the drawings, constituent elements having substantially the same functional configuration will be denoted by the same reference numeral and redundant description will be omitted.

Hereinafter, modes for carrying out the present technology will be described. The description will be given in the following order.

1. Favorable Embodiment of Present Disclosure
2. First Application Example
3. Second Application Example
4. Example of Execution by Software

1. Favorable Embodiment of Present Disclosure

<Overview of Present Disclosure>

A moving body of the present disclosure is a moving body that generates a local map required for autonomous movement.

First, the principle of detecting an obstacle 12 by a polarization camera 21 and a laser range finder 22 in a moving body 11 including the polarization camera 21 and the laser range finder 22 will be described with reference to FIG. 1. Here, the upper part of FIG. 1 is a diagram when the moving body 11 is viewed from above, and the lower part of FIG. 1 is a diagram when the moving body 11 is viewed from a side direction.

Furthermore, FIG. 1 illustrates the moving body 11, for example, in a state of moving in an advancing direction, which is the right direction in FIG. 1, on a road surface 13, and the obstacle 12 is present on the road surface 13 ahead in a moving direction of the moving body 11 slightly on the right side of the front.

The polarization camera 21 captures polarization imaging with a plurality of polarization directions of an area ahead, which is in the moving direction of the moving body 11, at an angle of view Z1.

The laser range finder 22 changes the light projection direction, for example, radially in the order of light projection directions L1, L2, ..., Ln as illustrated in the upper part of FIG. 1, and also projects infrared light almost parallel to the road surface 13 as illustrated in the lower part of FIG. 1.

Furthermore, when reflected light from the obstacle 12 or the like is received, the laser range finder 22 quantifies a distance to the obstacle 12 from a difference time between a timing when the infrared light is projected and a timing when the reflected light is received, by a so-called time-of-flight (ToF) method.

As a result, the laser range finder 22 quantifies the position (direction) and the distance of the obstacle 12 by recognizing in which direction the light was projected when the reflected light from the obstacle 12 is received.

<Case where Erroneous Detection is Produced>

Incidentally, the light projection direction of the laser range finder 22 is basically parallel to the road surface 13, in other words, the infrared light is projected in a horizontal direction to quantify the position and the distance of the obstacle 12.

However, since vibration occurs in the moving body 11 as the moving body 11 moves, tilt is produced in some cases. For example, as illustrated in the upper left part of FIG. 2, there are cases where the front of the moving body sinks downward and the infrared light projected in the light projection direction L is projected to a position 13a on the road surface 13; as a consequence, a distance F1 from the moving body 11 to the position 13a is quantified, and the obstacle 12 is erroneously detected to be present at the quantified position 13a.

Figure 2:
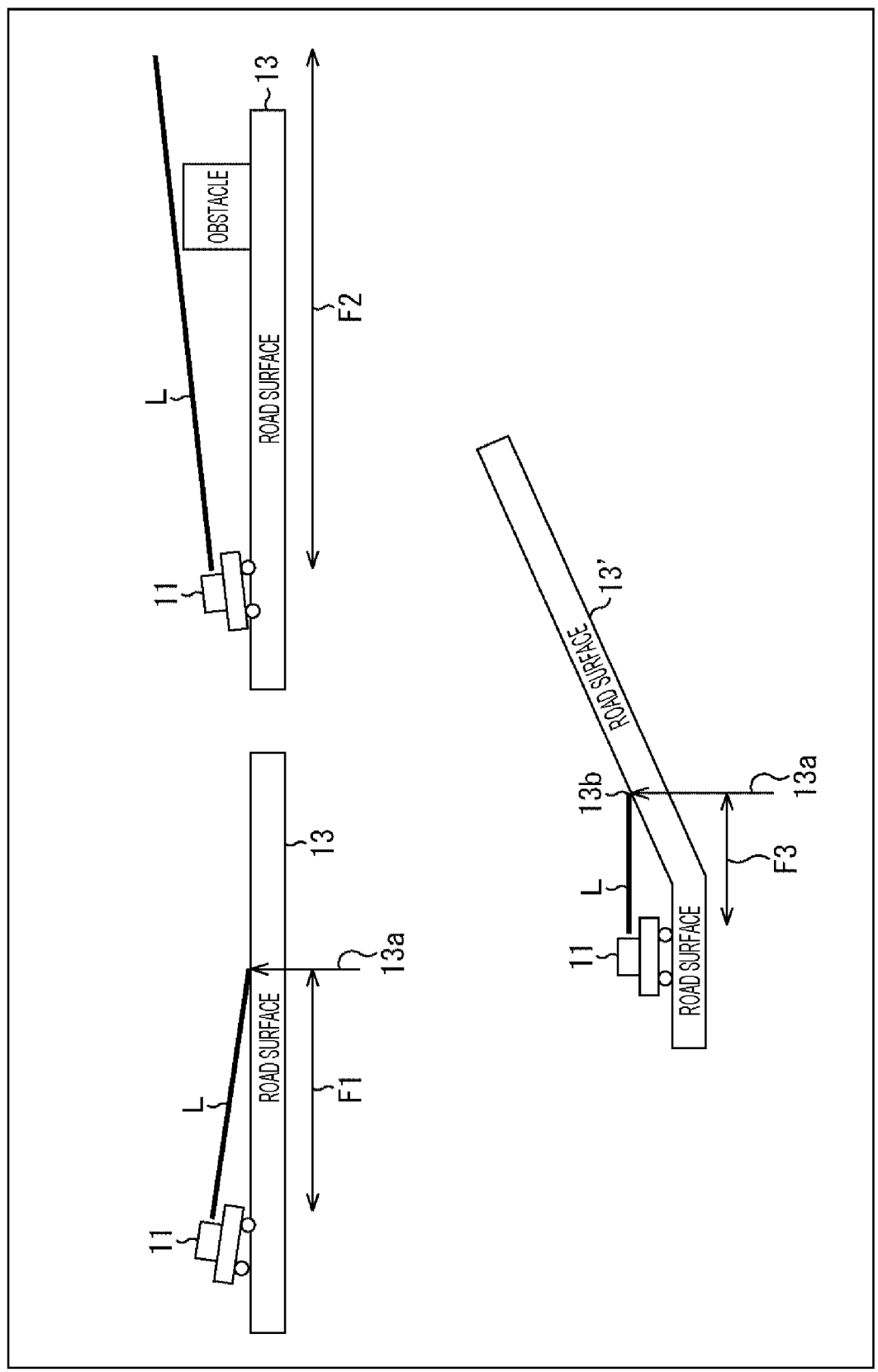
FIG. 2 is a diagram for explaining erroneous detection of an obstacle by a laser range finder.

Furthermore, as illustrated in the upper right part of FIG. 2, for example, there have been cases where the rear of the moving body sinks downward and the infrared light in the light projection direction L is not reflected by the obstacle 12 on the road surface 13; as a consequence, a distance F2 is regarded as infinite, and the moving body 11 thus cannot detect the whole presence of the obstacle 12, resulting in erroneous detection.

Moreover, as illustrated in the lower center part of FIG. 2, in a case where there is a road surface 13' such as an upward slope ahead of the moving body 11, there have been cases where the infrared light projected in the light projection direction L is reflected at a position 13b on the road surface 13'; as a consequence, a distance F3 from the moving body 11 to the position 13b is quantified, and the obstacle 12 is erroneously detected to be present at the quantified position 13b. Note that a case where the light projection direction is changed only in the horizontal direction has been described here; however, even in a case where the light projection direction is changed not only in the horizontal direction but also in a vertical direction, similar erroneous detection is produced in a case where the swing angle in the vertical direction is small.

<Principle to Suppress Erroneous Detection>

Figure 3:
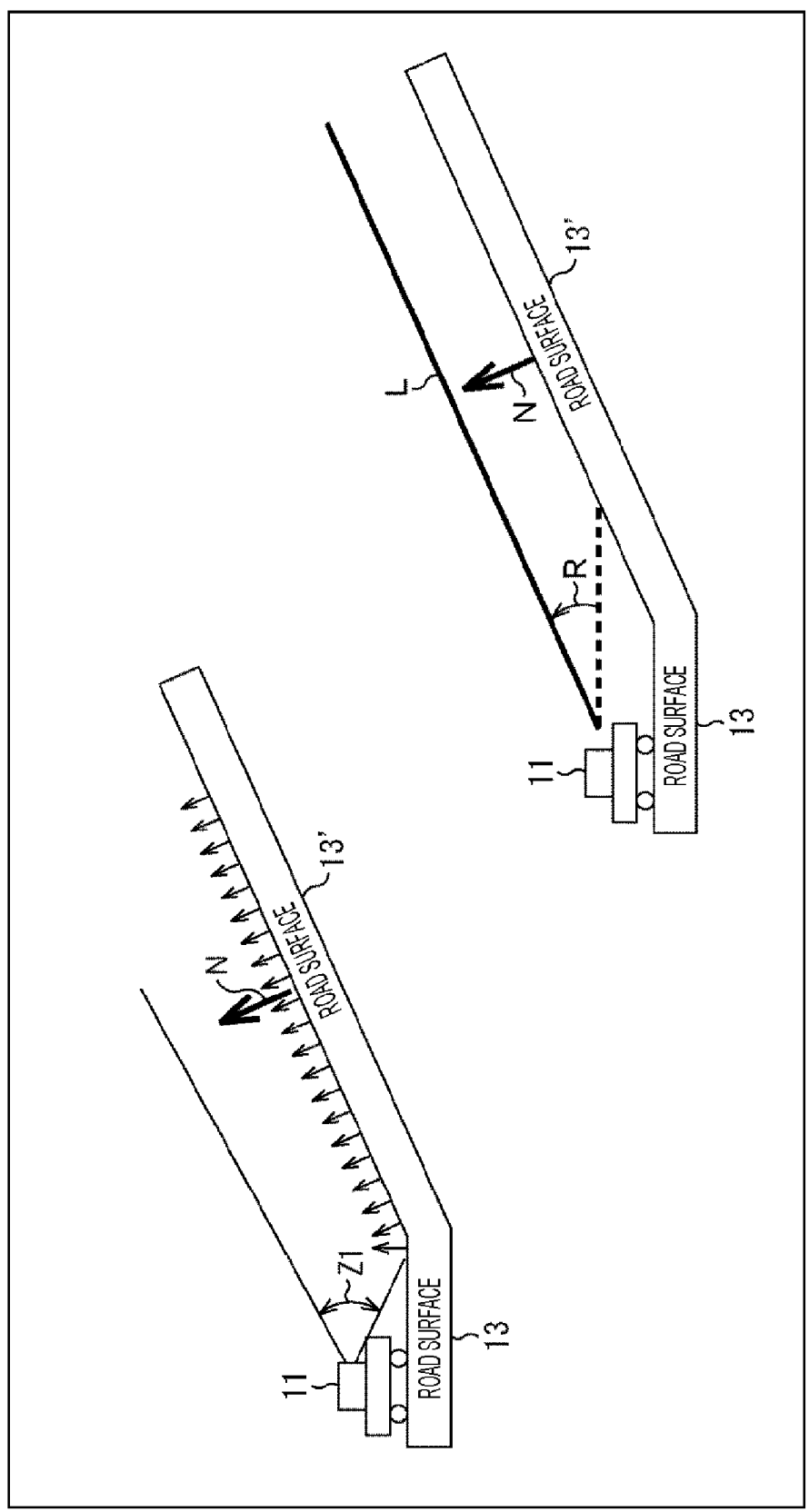
FIG. 3 is a diagram for explaining motions by a moving body control system of the present disclosure.

Therefore, the moving body 11 of the present disclosure obtains a normal vector N indicating a normal direction of the road surface 13' from polarized images with a plurality of polarization directions captured by the polarization camera 21, as illustrated in the left part of FIG. 3, and projects light by rotating the light projection direction L by an angle R in a direction orthogonal to the normal vector N, as illustrated in the right part of FIG. 3. Note that, even in a case where the light projection direction is changed not only in the horizontal direction but also in the vertical direction, the light projection direction L is rotated by an angle R in a direction orthogonal to the normal vector N for one of the swing angles in the vertical direction, or an average angle, or an angle being a median, or the like, in a case where the swing angle in the vertical direction is small.

By processing in this manner, it becomes possible to maintain the light projection direction L parallel to the road surface 13', and it becomes possible to suppress erroneous detection by the laser range finder 22.

As a result, an environment map based on the distance measurement result using the laser range finder 22 can be generated.

<Configuration Example of Moving Body Control System for Controlling Moving Body of Present Disclosure>

Figure 4:
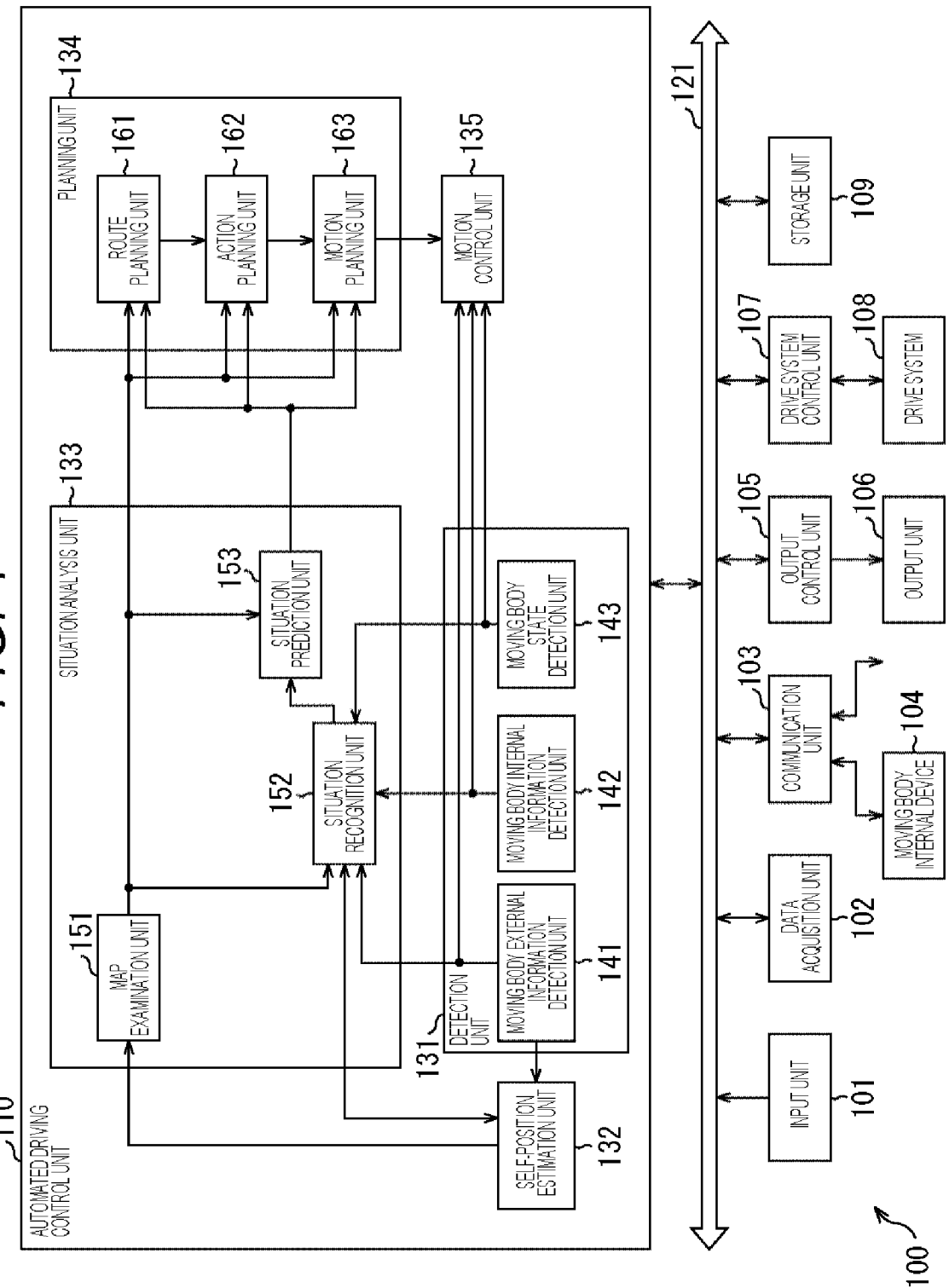
FIG. 4 is a block diagram illustrating a configuration example of a favorable embodiment of the moving body control system of the present disclosure.

FIG. 4 is a block diagram illustrating an example of a schematic functional configuration of a moving body control system 100 that controls the moving body 11. Note that the moving body control system 100 in FIG. 4 is an example of a moving body control system to which the present technology can be applied, and can also be applied as a system that controls other moving bodies such as an aircraft, a ship, a drone, and a robot.

The moving body control system 100 includes an input unit 101, a data acquisition unit 102, a communication unit 103, a moving body internal device 104, an output control unit 105, an output unit 106, a drive system control unit 107, a drive system 108, a storage unit 109, and an automated driving control unit 110. The input unit 101, the data acquisition unit 102, the communication unit 103, the output control unit 105, the drive system control unit 107, the storage unit 109, and the automated driving control unit 110 are mutually connected via a communication network 121. The communication network 121 is constituted by a communication network, a bus, and the like conforming to an arbitrary standard such as a controller area network (CAN), a local interconnect network (LIN), a local area network (LAN), and FlexRay (registered trademark). Note that respective units of the moving body control system 100 are connected directly not via the communication network 121 in some cases.

In addition, hereinafter, in a case where each unit of the moving body control system 100 performs communication via the communication network 121, the mention to the communication network 121 will be omitted. For example, in a case where the input unit 101 and the automated driving control unit 110 communicate with each other via the communication network 121, it is merely described that the input unit 101 and the automated driving control unit 110 communicate with each other.

The input unit 101 includes an apparatus used by a passenger to input various types of data, instructions, and the like. For example, the input unit 101 includes operation devices such as a touch panel, a button, a microphone, a switch, and a lever, and an operation device with which an input can be made by a method other than manual operation, for example, by sound or gesture. Furthermore, for example, the input unit 101 may be a remote control apparatus using infrared rays or other radio waves, or an externally connected device compatible with the operation of the moving body control system 100, such as a mobile device or wearable device. The input unit 101 generates an input signal on the basis of data, an instruction, and the like input by a passenger and supplies the generated input signal to each unit of the moving body control system 100.

The data acquisition unit 102 includes various sensors or the like that acquire data used for the process of the moving body control system 100 and supplies the acquired data to each unit of the moving body control system 100.

For example, the data acquisition unit 102 includes various sensors for detecting the state and the like of the moving body. Specifically, for example, the data acquisition unit 102 includes a gyro sensor, an acceleration sensor, an inertial measurement unit (IMU), and a sensor for detecting an operation amount of an accelerator pedal, an operation amount of a brake pedal, a steering angle of a steering wheel, engine speed, motor rotation speed, rotation speed of a wheel, or the like.

Furthermore, for example, the data acquisition unit 102 includes various sensors for detecting information outside the moving body. Specifically, for example, the data acquisition unit 102 includes an imaging apparatus such as a time-of-flight (ToF) camera, a stereo camera, a monocular camera, an infrared camera, a polarization camera, and other cameras. In addition, for example, the data acquisition unit 102 includes an environmental sensor for detecting weather, meteorology, or the like, and an ambient information detecting sensor for detecting an object around the moving body. The environmental sensor is constituted by, for example, a raindrop sensor, a fog sensor, a sunshine sensor, and a snow sensor. The ambient information detecting sensor is constituted by, for example, a laser range finder, an ultrasonic sensor, a radar, a light detection and ranging or laser imaging detection and ranging (LiDAR) unit, and a sonar. Note that, in the moving body control system 100 of the present disclosure, the data acquisition unit 102 includes the polarization camera 21 in FIG. 1 as an imaging apparatus, and includes the laser range finder 22 in FIG. 1 as an ambient information detecting sensor.

Moreover, for example, the data acquisition unit 102 includes various sensors for detecting the current position of the moving body. Specifically, for example, the data acquisition unit 102 includes a global navigation satellite system (GNSS) receiver that receives a GNSS signal from a GNSS satellite, or the like.

Furthermore, for example, the data acquisition unit 102 includes various sensors for detecting information inside the moving body. Specifically, for example, the data acquisition unit 102 includes an imaging apparatus that images the driver, a biometric sensor that detects biometric information of the driver, and a microphone that collects sound in the room of the moving body. The biometric sensor is provided, for example, on a seating surface or a steering wheel and detects biometric information on a passenger sitting on a seat or the driver gripping the steering wheel.

The communication unit 103 communicates with the moving body internal device 104 and a variety of devices outside the moving body, a server, a base station, and the like, to transmit data supplied from each unit of the moving body control system 100 and to supply the received data to each unit of the moving body control system 100. Note that the communication protocol supported by the communication unit 103 is not particularly limited, and the communication unit 103 can also support a plurality of types of communication protocols.

For example, the communication unit 103 performs wireless communication with the moving body internal device 104 by a wireless LAN, Bluetooth (registered trademark), near field communication (NFC), a wireless universal serial bus (WUSB), or the like. Furthermore, for example, the communication unit 103 performs wired communication with the moving body internal device 104 by a universal serial bus (USB), high-definition multimedia interface (HDMI) (registered trademark), mobile high-definition link (MHL) or the like, via a connection terminal (not illustrated) (and a cable, if necessary).

Moreover, the communication unit 103 communicates with a device (for example, an application server or a control server) present on an external network (for example, the Internet, a cloud network, or a company's own network) via a base station or an access point, for example. Furthermore, the communication unit 103 uses, for example, a peer-to-peer (P2P) technology to communicate with a terminal present in the vicinity of the moving body (for example, a terminal of a pedestrian or a shop, or a machine type communication (MTC) terminal). Moreover, for example, in a case where the moving body 11 is a vehicle, the communication unit 103 performs vehicle-to-everything (V2X) communication such as vehicle-to-vehicle communication, vehicle-to-infrastructure communication, vehicle-to-home communication, and vehicle-to-pedestrian communication. Furthermore, the communication unit 103 includes a beacon receiving unit to receive, for example, radio waves or electromagnetic waves emitted from a wireless station or the like installed on the road, and to acquire information on the current position, congestion, traffic restrictions, required time, or the like.

The moving body internal device 104 includes, for example, a mobile device or wearable device owned by a passenger, an information device carried in or attached to the moving body, and a navigation apparatus that searches for a course to an arbitrary destination.

The output control unit 105 controls the output of various types of information to a passenger of the moving body or the outside of the moving body. For example, the output control unit 105 generates an output signal including at least one of visual information (for example, image data) or auditory information (for example, sound data), and supplies the generated output signal to the output unit 106, to control the output of the visual and auditory information from the output unit 106. Specifically, for example, the output control unit 105 combines image data captured by different imaging apparatuses of the data acquisition unit 102 to generate an overhead image, a panoramic image, or the like, and supplies an output signal including the generated image to the output unit 106. Furthermore, for example, the output control unit 105 generates sound data including a warning sound or a warning message or the like for danger such as collision, a minor accident, entry to a danger zone, and the like, and supplies an output signal including the generated sound data to the output unit 106.

The output unit 106 includes an apparatus capable of outputting visual information or auditory information to a passenger of the moving body or the outside of the moving body. For example, the output unit 106 includes a display apparatus, an instrument panel, an audio speaker, headphones, a wearable device such as a glasses-type display worn by a passenger, a projector, a lamp, and the like. In addition to an apparatus having a normal display, the display apparatus included in the output unit 106 may be an apparatus that displays visual information in the driver's field of view, such as a head-up display, a transmissive display, and an apparatus having an augmented reality (AR) display function.

The drive system control unit 107 controls the drive system 108 by generating various control signals and supplying the generated various control signals to the drive system 108. Furthermore, the drive system control unit 107 supplies a control signal to each unit other than the drive system 108 as necessary, and notifies each unit of a control state of the drive system 108, for example.

The drive system 108 includes various apparatuses related to the drive system of the moving body. For example, the drive system 108 includes a driving force generating apparatus for generating a driving force, such as an internal combustion engine or a driving motor; a driving force transmission mechanism for transmitting the driving force to the wheels; a steering mechanism that regulates a steering angle; a braking apparatus that generates a braking force; an antilock brake system (ABS); an electronic stability control (ESC); an electric power steering apparatus; and the like.

The storage unit 109 includes, for example, a magnetic storage device such as a read only memory (ROM), a random access memory (RAM), and a hard disc drive (HDD), a semiconductor storage device, an optical storage device, and a magneto-optical storage device. The storage unit 109 stores various types of programs, data, and the like used by each unit of the moving body control system 100. For example, the storage unit 109 stores map data such as a three-dimensional high-accuracy map exemplified by a dynamic map, a global map that covers a wider area with lower accuracy than the high-accuracy map, and a local map that contains information around the moving body.

The automated driving control unit 110 performs control related to automated driving such as autonomous movement or driving assistance. Specifically, for example, the automated driving control unit 110 performs coordinative control for the purpose of implementing the function of an advanced driver assistance system (ADAS) including moving body collision avoidance or impact mitigation, follow-up running based on inter-moving body distance, moving body speed maintenance running, moving body collision warning, or moving body lane departure warning. Furthermore, for example, the automated driving control unit 110 performs coordinative control for the purpose of automated driving or the like that allows to move autonomously without depending on the driver's operation. The automated driving control unit 110 includes a detection unit 131, a self-position estimation unit 132, a situation analysis unit 133, a planning unit 134, and a motion control unit 135.

The detection unit 131 detects various types of information necessary for control of automated driving. The detection unit 131 includes a moving body external information detection unit 141, a moving body internal information detection unit 142, and a moving body state detection unit 143.

The moving body external information detection unit 141 performs a detection process for information outside the moving body on the basis of data or a signal from each unit of the moving body control system 100. For example, the moving body external information detection unit 141 performs a detection process, a recognition process, and a tracking process for an object around the moving body, and a detection process for the distance to an object. The objects to be detected include, for example, moving bodies, people, obstacles, structures, roads, traffic lights, traffic signs, and road markings. Furthermore, for example, the moving body external information detection unit 141 performs a detection process for the environment around the moving body. The environment around the mobile body to be detected includes, for example, weather, temperature, humidity, brightness, and a road surface condition. The moving body external information detection unit 141 supplies data indicating the result of the detection process to the self-position estimation unit 132, a map examination unit 151 and a situation recognition unit 152 of the situation analysis unit 133, an emergency event avoidance unit 171 of the motion control unit 135, and the like.

The moving body internal information detection unit 142 performs a detection process for information inside the moving body on the basis of data or a signal from each unit of the moving body control system 100. For example, the moving body internal information detection unit 142 performs an authentication process and a recognition process for the driver, a detection process for the driver's condition, a detection process for a passenger, a detection process for the environment inside the moving body, and the like. The driver's condition to be detected includes, for example, the physical condition, the degree of awakening, the degree of concentration, the degree of fatigue, and the direction of line of sight. The environment inside the moving body to be detected includes, for example, temperature, humidity, brightness, and odor. The moving body internal information detection unit 142 supplies data indicating the result of the detection process to the situation recognition unit 152 of the situation analysis unit 133, the emergency event avoidance unit 171 of the motion control unit 135, and the like.

The moving body state detection unit 143 performs a detection process for the state of the moving body on the basis of data or a signal from each unit of the moving body control system 100. The state of the moving body to be detected includes, for example, the speed, the acceleration, the steering angle, the presence or absence and the contents of an abnormality, the state of driving operation, the position and inclination of power seat, the state of door lock, and the state of other moving body-mounted devices. The moving body state detection unit 143 supplies data indicating the result of the detection process to the situation recognition unit 152 of the situation analysis unit 133, the emergency event avoidance unit 171 of the motion control unit 135, and the like.

The self-position estimation unit 132 performs an estimation process for the position, posture, and the like of the moving body on the basis of data or a signal from each unit of the moving body control system 100, such as the moving body external information detection unit 141 and the situation recognition unit 152 of the situation analysis unit 133. Furthermore, the self-position estimation unit 132 generates a local map (hereinafter, referred to as self-position estimation map) used to estimate the self-position, as necessary.

The self-position estimation map is, for example, a map with high accuracy using a technology such as simultaneous localization and mapping (SLAM). The self-position estimation unit 132 supplies data indicating the result of the estimation process to the map examination unit 151 and the situation recognition unit 152 of the situation analysis unit 133, and the like. Furthermore, the self-position estimation unit 132 stores the self-position estimation map in the storage unit 109.

The situation analysis unit 133 performs an analysis process for the moving body and the situation around the moving body. The situation analysis unit 133 includes the map examination unit 151, the situation recognition unit 152, and a situation prediction unit 153.

The map examination unit 151 performs an examination process for various maps stored in the storage unit 109 while using data or a signal from each unit of the moving body control system 100, such as the self-position estimation unit 132 and the moving body external information detection unit 141 as necessary, and constructs a map that contains information necessary for processing automated driving. The map examination unit 151 supplies the constructed map to the situation recognition unit 152, the situation prediction unit 153, and a route planning unit 161, an action planning unit 162, and a motion planning unit 163 of the planning unit 134, and the like.

The situation recognition unit 152 performs a recognition process for the situation related to the moving body on the basis of data or a signal from each unit of the moving body control system 100, such as the self-position estimation unit 132, the moving body external information detection unit 141, the moving body internal information detection unit 142, the moving body state detection unit 143, and the map examination unit 151. For example, the situation recognition unit 152 performs a recognition process for the situation of the moving body, the situation around the moving body, the situation of the driver of the moving body, and the like. Furthermore, the situation recognition unit 152 generates a local map (hereinafter referred to as situation recognition map) used to recognize the situation around the moving body, as necessary. The situation recognition map is, for example, an occupancy grid map.

The situation of the moving body to be recognized includes, for example, the position, posture, and activity (for example, speed, acceleration, and moving direction) of the moving body, and the presence or absence and the contents of an abnormality. The situation around the moving body to be recognized includes, for example, the type and position of a surrounding stationary object, the type, position and activity (for example, speed, acceleration, and moving direction) of a surrounding moving object, the configuration and the road surface condition of surrounding roads, and ambient weather, temperature, humidity, and brightness. The condition of the driver to be recognized includes, for example, the physical condition, the degree of awakening, the degree of concentration, the degree of fatigue, the shift of line of sight, and driving operation.

The situation recognition unit 152 supplies data (including the situation recognition map, if necessary) indicating the result of the recognition process to the self-position estimation unit 132, the situation prediction unit 153, and the like. Furthermore, the situation recognition unit 152 stores the situation recognition map in the storage unit 109.

The situation prediction unit 153 performs a prediction process for the situation related to the moving body on the basis of data or a signal from each unit of the moving body control system 100, such as the map examination unit 151 and the situation recognition unit 152. For example, the situation prediction unit 153 performs a prediction process for the situation of the moving body, the situation around the moving body, the situation of the driver, and the like.

The situation of the moving body to be predicted includes, for example, the behavior of the moving body, the occurrence of an abnormality, and the movable distance. The situation around the moving body to be predicted includes, for example, the behavior of a moving object around the moving body, a change in the signal state, and a change in the environment such as the weather. The situation of the driver to be predicted includes, for example, the driver's behavior and physical condition.

The situation prediction unit 153 supplies data indicating the result of the prediction process, together with the data from the situation recognition unit 152, to the route planning unit 161, the action planning unit 162, the motion planning unit 163 of the planning unit 134, and the like.

The route planning unit 161 plans a route to a destination on the basis of data or a signal from each unit of the moving body control system 100, such as the map examination unit 151 and the situation prediction unit 153. For example, the route planning unit 161 sets a route from the current position to a specified destination on the basis of the global map. Furthermore, for example, the route planning unit 161 alters the route as appropriate on the basis of situations such as congestion, an accident, traffic restrictions, and construction, and the physical condition of the driver, and the like. The route planning unit 161 supplies data indicating the planned route to the action planning unit 162 and the like.

The action planning unit 162 plans an action of the moving body to safely move on the route planned by the route planning unit 161 within a planned time, on the basis of data or a signal from each unit of the moving body control system 100, such as the map examination unit 151 and the situation prediction unit 153. For example, the action planning unit 162 performs planning for start, stop, advancing direction (for example, forward, backward, left turn, right turn, or direction change), moving speed, overtaking, and the like. The action planning unit 162 supplies data indicating the planned action of the moving body to the motion planning unit 163 and the like.

The motion planning unit 163 plans a motion of the moving body to implement the action planned by the action planning unit 162, on the basis of data or a signal from each unit of the moving body control system 100, such as the map examination unit 151 and the situation prediction unit 153. For example, the motion planning unit 163 performs planning for acceleration, deceleration, moving trajectory, and the like. The motion planning unit 163 supplies data indicating the planned motion of the moving body to the motion control unit 135 and the like.

The motion control unit 135 controls the motion of the moving body.

In more detail, the motion control unit 135 performs a detection process for emergency events such as collision, a minor accident, entry to a danger zone, an abnormality of the driver, and an abnormality of the moving body, on the basis of the detection results of the moving body external information detection unit 141, the moving body internal information detection unit 142, and the moving body state detection unit 143. In a case where the motion control unit 135 detects the occurrence of an emergency event, the motion control unit 135 plans a motion of the moving body for avoiding the emergency event, such as a sudden stop or a quick turn.

Furthermore, the motion control unit 135 performs acceleration/deceleration control for implementing the motion of the moving body planned by the motion planning unit 163. For example, the motion control unit 135 computes a desired control value of the driving force generating apparatus or the braking apparatus for implementing planned acceleration, deceleration, or sudden stop, and supplies a control command indicating the computed desired control value to the drive system control unit 107.

The motion control unit 135 performs direction control for implementing the motion of the moving body planned by the motion planning unit 163. For example, the motion control unit 135 computes a desired control value of the steering mechanism for implementing a moving trajectory or a quick turn planned by the motion planning unit 163, and supplies a control command indicating the computed desired control value to the drive system control unit 107.

<Configuration Example for Generating Environment Map>

Next, a detailed configuration example for generating an environment map in the moving body control system 100 in FIG. 4 will be described with reference to FIG. 5. Note that the environment map mentioned here is the situation recognition map described above, which is a local map used for recognizing the situation around the moving body, and more specifically, is an occupancy grid map.

Figure 5:
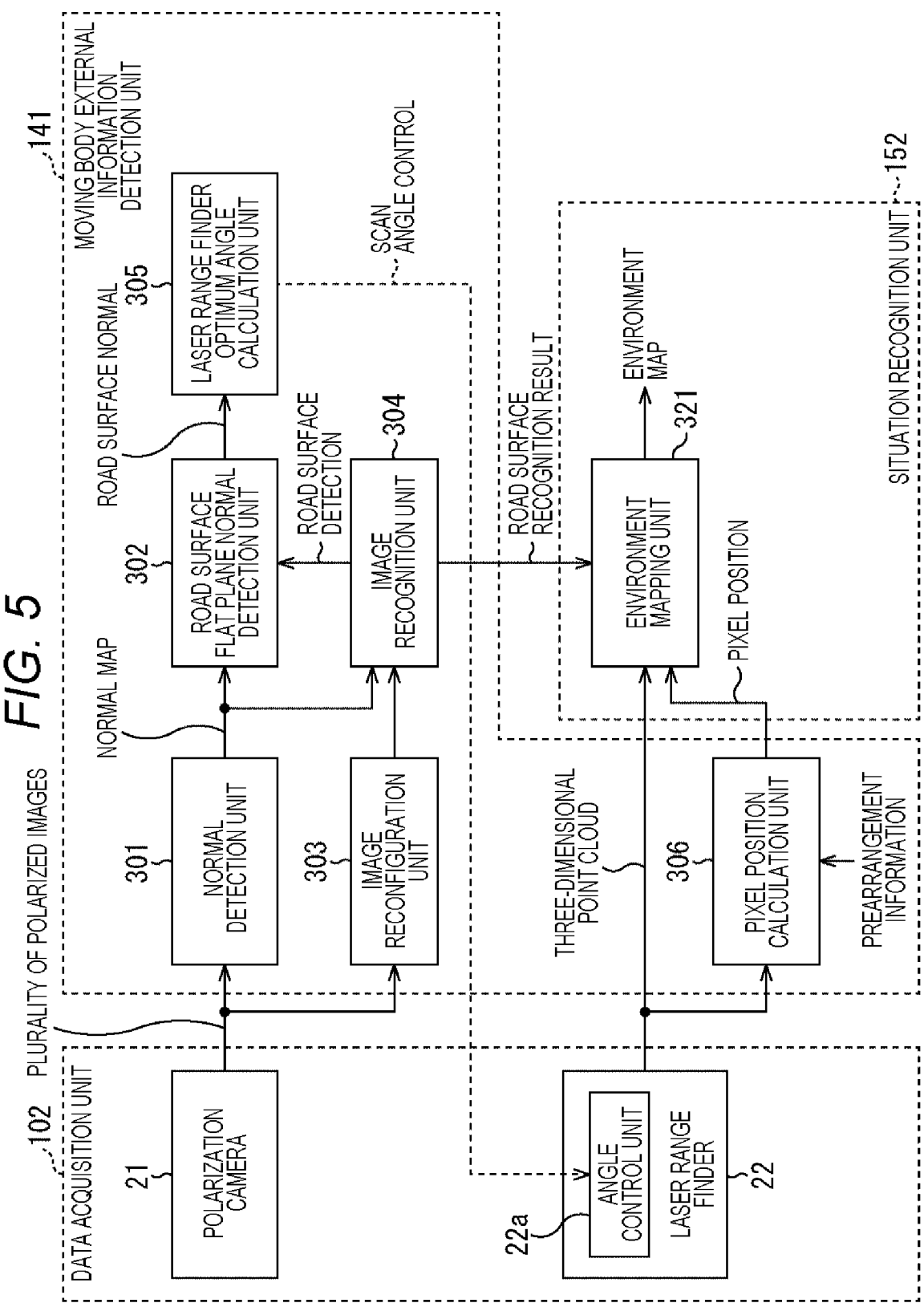
FIG. 5 is a block diagram for explaining a configuration example for generating an environment map in the moving body control system of the present disclosure.

As illustrated in FIG. 5, a detailed configuration example for generating the environment map is configured from the data acquisition unit 102, the moving body external information detection unit 141 in the detection unit 131 of the automated driving control unit 110, and the situation recognition unit 152 of the situation analysis unit 133.

The data acquisition unit 102 includes the polarization camera 21 and the laser range finder 22.

The moving body external information detection unit 141 includes a normal detection unit 301, a road surface flat plane normal detection unit 302, an image reconfiguration unit 303, an image recognition unit 304, a laser range finder optimum angle calculation unit 305, and a pixel position calculation unit 306.

The situation recognition unit 152 includes an environment mapping unit 321.

The laser range finder 22 projects an infrared light laser while varying its angle with respect to the horizontal direction and, when the projected infrared light laser is reflected from an obstacle, also quantifies the direction and distance of the obstacle from the moving body 11 on the basis of the reciprocation time of the infrared light laser by a so-called time-of-flight (ToF) method; the laser range finder 22 then outputs the quantified direction and distance to the pixel position calculation unit 306 and the environment mapping unit 321 as a three-dimensional point cloud.

Furthermore, the laser range finder 22 includes an angle control unit 22a that controls the angle of the light projection direction in the vertical direction, and controls the angle in the vertical direction for the light projection direction on the basis of information on an optimum angle supplied from the laser range finder optimum angle calculation unit 305.

As for the light projection direction of the laser range finder 22, the whole main body of the laser range finder 22 may be rotated by a driving device (not illustrated), or the light projection direction may be changed by controlling a micro electro mechanical systems (MEMS) mirror. Alternatively, light may be projected by setting a plurality of light projection directions radially such that light is received by light receiving units in a two-dimensional array form, and only an effective received light signal is selected.

The polarization camera 21 captures polarized images with a plurality of polarization directions, which have passed through filters for a plurality of polarization directions, and outputs the captured polarized images to the normal detection unit 301 and the image reconfiguration unit 303.

On the basis of the polarized images with the plurality of polarization directions, the normal detection unit 301 generates a normal map constituted by a normal direction of a surface of an object in units of pixels of the polarized images, and outputs the generated normal map to the road surface flat plane normal detection unit 302 and the image recognition unit 304. Note that the normal detection of the normal detection unit 301 will be described later in detail with reference to FIG. 6.

The image reconfiguration unit 303 reconfigures a non-polarized image using the polarized images with the plurality of polarization directions, and outputs the reconfigured non-polarized image to the image recognition unit 304.

The image recognition unit 304 estimates a pixel belonging to the region of the road surface using machine learning such as deep learning on the basis of the normal map and the non-polarized image, and outputs the estimation result to the road surface flat plane normal detection unit 302 and the environment mapping unit 321. Note that the image recognition will be described later in detail with reference to FIG. 8.

The road surface flat plane normal detection unit 302 uses the normal map from the normal detection unit 301 and information on a pixel belonging to the region of the road surface to obtain the normal direction (a normal vector of the road surface) of a flat plane forming the road surface in a three-dimensional space, and outputs the obtained normal direction to the laser range finder optimum angle calculation unit 305 as information on a road surface normal. Note that the road surface flat plane normal detection will be described later in detail with reference to FIG. 7.

The laser range finder optimum angle calculation unit 305 calculates an optimum angle for adjusting the light projection direction of the laser range finder 22 to a direction orthogonal to the road surface normal, on the basis of information on the normal direction of the flat plane forming the road surface flat plane, which is the information on the road surface normal, and outputs the calculated optimum angle to the laser range finder 22.

The pixel position calculation unit 306 converts a three-dimensional point coordinates of the obstacle detected by the laser range finder 22, which is the quantification result of the laser range finder 22, into a coordinate system of the polarization camera 21, and outputs the converted coordinates to the environment mapping unit 321. Note that the integration of the coordinate systems between the laser range finder 22 and the polarization camera 21 will be described later in detail with reference to FIG. 9.

The environment mapping unit 321 generates an environment map by an environment mapping process on the basis of information on the three-dimensional point cloud supplied from the laser range finder 22 and information on a pixel belonging to the road surface 13. Note that the environment mapping will be described later in detail with reference to FIG. 10.

<Normal Detection from Polarized Image>

Next, normal detection from a polarized image will be described with reference to FIG. 6.

The normal detection unit 301 generates a normal map by obtaining a normal direction of a surface of a subject to which each pixel in the image belongs, on the basis of a plurality of polarized images, as polar coordinates constituted by a zenith angle θ and an azimuth angle φ.

Figure 6:
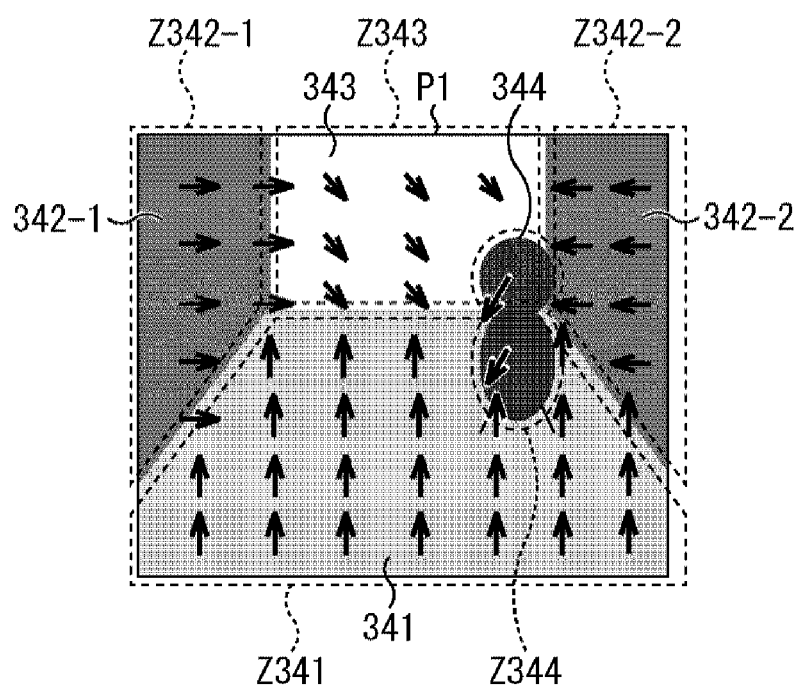
FIG. 6 is a diagram for explaining an example of detecting a normal direction of a surface of a subject in an image.
Figure 7:
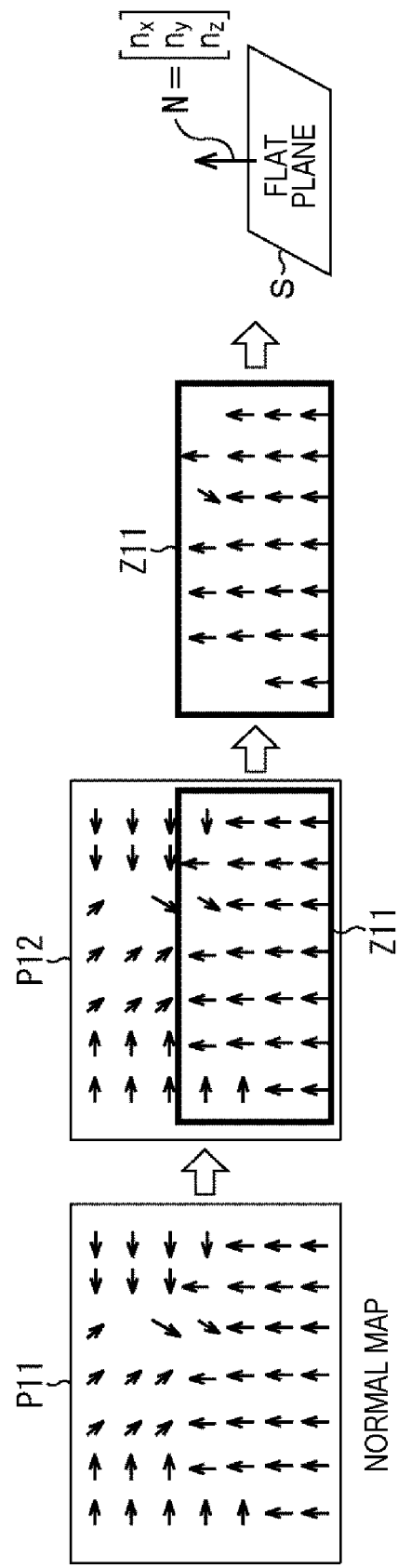
FIG. 7 is a diagram for explaining a method of obtaining a flat plane forming a road surface.

For example, in the case of an image P1 in FIG. 6, the distribution of arrows indicating the normal directions is taken as the normal map (the leftmost part of FIG. 7).

In other words, in FIG. 6, a region from near almost the center to the lower part of the image P1 is taken as a region 2341 of a road surface 341, regions on the left and right are taken as regions Z342-1 and Z342-2 of three-dimensional structures (walls) 342-1 and 342-2, a region at the upper center is taken as a region 2343 of sky 343, and additionally, a region on the left side of the region Z342-2 of the three-dimensional structure 342-2 on the right side, which is a region of a person 344 standing on the region 2341 constituted by the road surface 341, is taken as a region 2344.

On the region 2341 of the road surface 341, arrows indicating normal directions, which are vertical directions with respect to the road surface 341, are distributed. Furthermore, in the region Z342-1 of the wall 342-1 as a three-dimensional structure, which is in the left part of the image P1, arrows pointing in the right direction of FIG. 6, which is the vertical direction with respect to the wall 342-1, are distributed. Moreover, in the region Z342-2 of the wall 342-2 as a three-dimensional structure, which is in the right part of the image P1, arrows pointing in the left direction of FIG. 6, which is the vertical direction with respect to the wall 342-1, are distributed. In addition, in the region 2343 of the sky 343 in the image P1, arrows pointing in the diagonal lower right direction of FIG. 6 are distributed. Additionally, in the region 2344 of the person 344 on the left side of the region Z342-2 of the wall 342-2 as a three-dimensional structure which is in the right part of the image P1, arrows pointing in the diagonal lower left direction of FIG. 6 are distributed.

<Road Surface Flat Plane Normal Detection>

Next, road surface flat plane normal detection will be described with reference to FIG. 7.

In the road surface flat plane normal detection, a dominant normal direction in pixels in a region of the normal map belonging to the road surface, which has been supplied from the image recognition unit 304, is detected as the normal direction of the road surface.

In other words, for example, the case of a normal map P11 as illustrated in the leftmost part of FIG. 7 is considered. At this time, as illustrated in the second figure from the left in FIG. 7, in a case where the region of pixels labeled as the road surface 13 in the normal map P11 is a region Z11, information on the normal map of the region Z11 is extracted as a region-of-interest (ROI) region.

Next, as illustrated in the third figure from the left in FIG. 7, a normal that is not clearly in the normal direction of the road surface, such as a normal facing the polarization camera 21, is excluded from the normals in the extracted region Z11.

Then, a histogram is generated from the remaining normals, dominant normals are extracted, and information on each normal constituted by the zenith angle θ and the azimuth angle φ is converted into an orthogonal coordinate system; thereafter, as illustrated in the rightmost part of FIG. 7, the converted information is output as a normal vector N[nx, ny, nz] of a flat plane S forming the road surface.

<Image Recognition>

Next, image recognition will be described with reference to FIG. 8.

Figure 8:
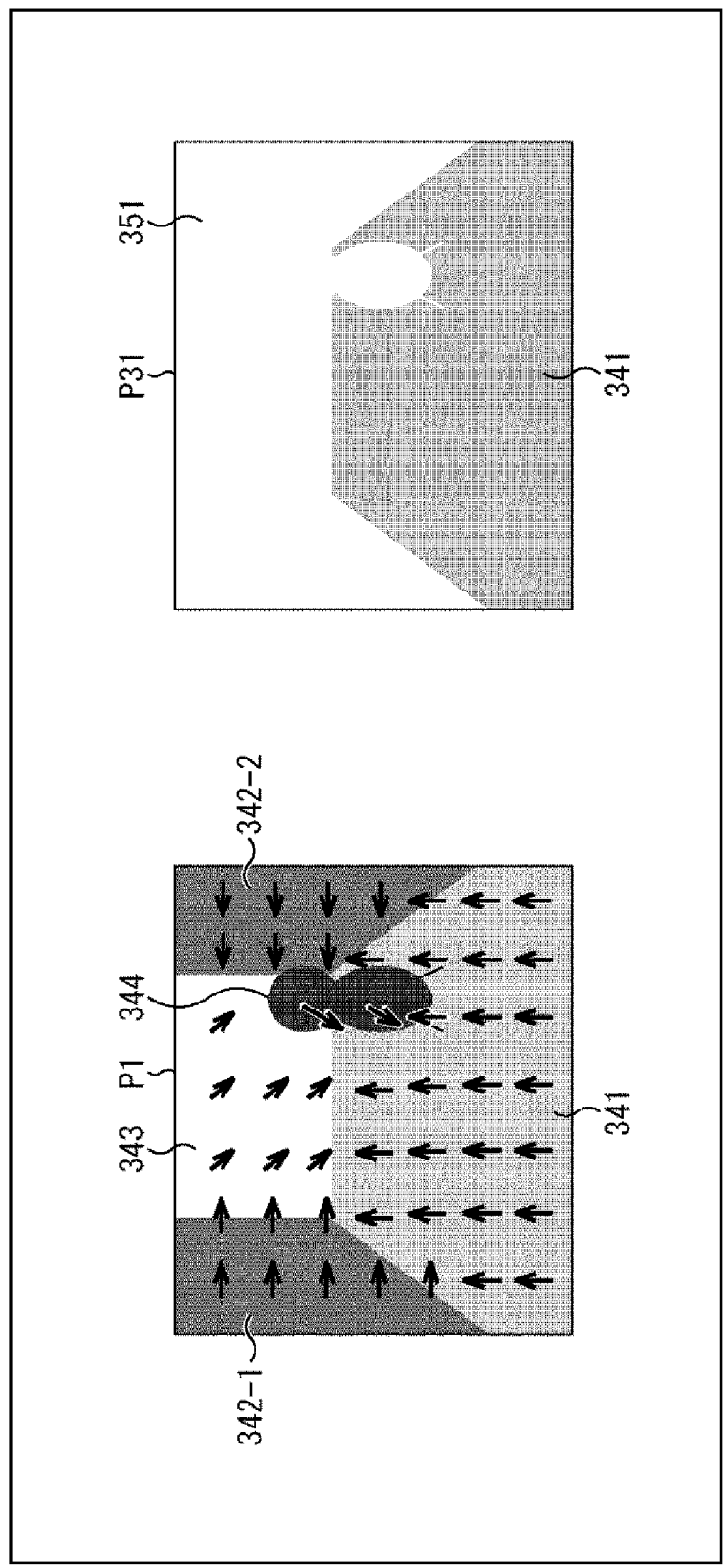
FIG. 8 is a diagram for explaining image recognition.

For example, it is estimated whether or not each pixel of the image P1 in the left part of FIG. 8 constituted by the normal map and the non-polarized image is a pixel belonging to the region of the road surface, by machine learning such as deep learning and, for example, as indicated by a road surface detection result P31 in FIG. 8, the estimation result is output as information on the region 2341 belonging to the road surface 341 and a region 2351 other than the region 2341.

For example, a region where the absolute value of the inner product of a perpendicular direction and the detected normal vector is greater than a predetermined value may be assumed as the road surface 341.

<Integration of Coordinate Systems between Laser Range Finder and Polarization Camera>

Next, integration of coordinate systems between the laser range finder 22 and the polarization camera 21 will be described with reference to FIG. 9.

Figure 9:
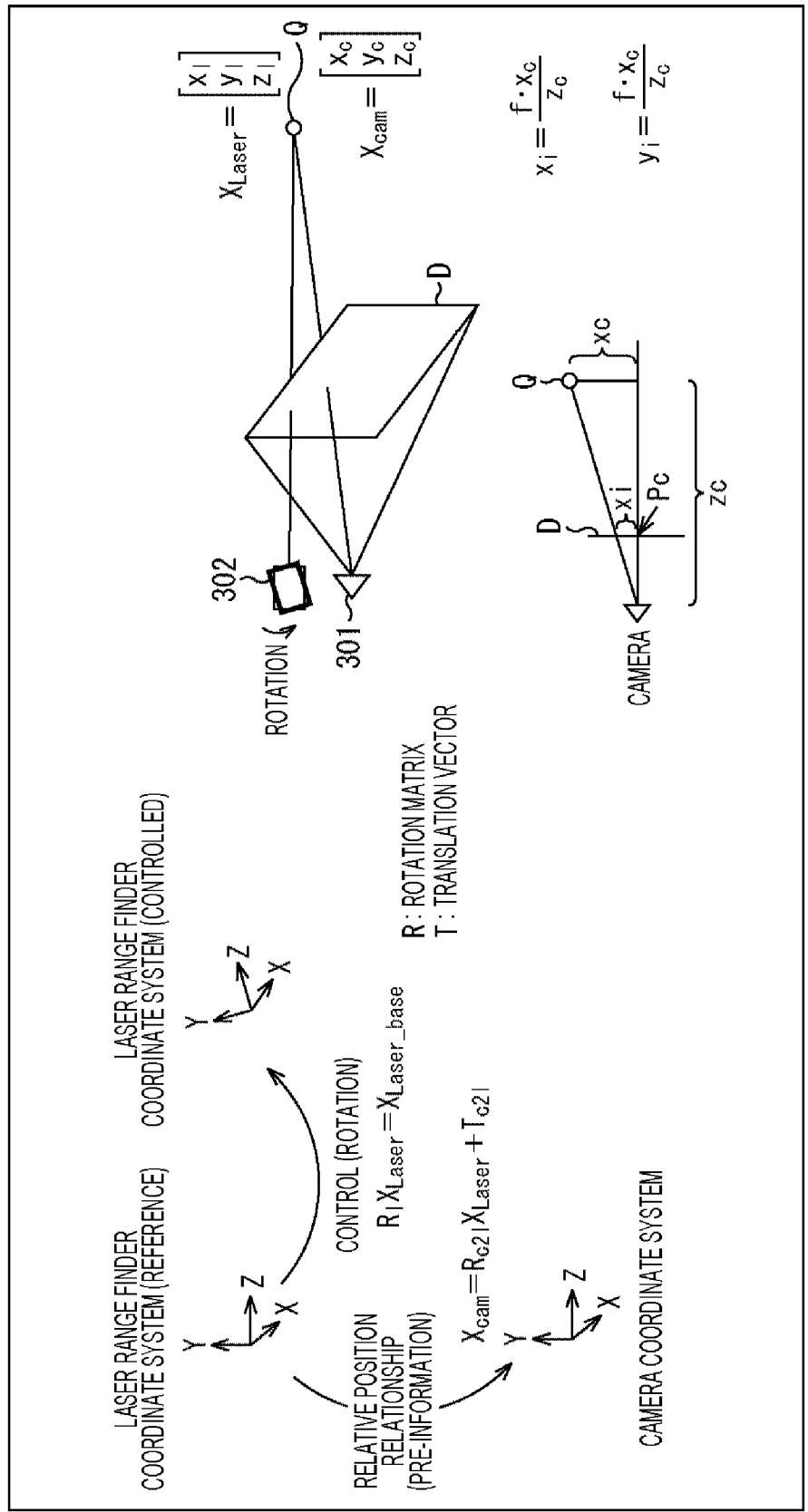
FIG. 9 is a diagram for explaining conversion of a coordinate system between a laser range finder and a polarization camera.

As illustrated in the left part of FIG. 9, a coordinate system in which the distance is measured by the laser range finder 22 is defined by following formula (1) as the light projection direction changes.

$$X_{Laser} = R_1 \times X_{Laser\_base} \quad (1)$$

Here, $R_1$ denotes a rotation matrix according to an angle at which the light projection direction of the laser is rotated in the horizontal direction, $X_{Laser\_base}$ denotes reference coordinates before the light projection direction of the laser is rotated, and $X_{Laser}$ denotes the coordinates after the light projection direction of the laser is controlled and rotated.

Furthermore, the relationship between the coordinates $X_{Laser}$ (=the transposed matrix of [x1, y1, z1]) and coordinates $X_{cam}$ (=the transposed matrix of [xc, yc, zc]) on an imaging plane D in the coordinate system of the polarization camera 21 is obtained, for example, as following formula (2) using prearrangement information by calibration.

$$X_{cam} = R_{c21} \times X_{Laser} + T_{21} = R_{c21} \times R_1 \times X_{Laser\_base} + T_{c21} \quad (2)$$

Here, $R_{c21}$ denotes a rotation matrix indicating rotation between the laser range finder 22 and the polarization camera 21, which has been made known by calibration in advance, and $T_{c21}$ denotes a translation vector which has been made known in advance.

By computing formula (2) mentioned above, the coordinates of a point X on a flat plane forming the road surface, which have been quantified as information in the coordinate system of laser range finder 22, is converted into a camera coordinate system and integrated.

Furthermore, when a position $X_{cam}$ (=[xc, yc, zc] transposition) of the obstacle detected by the laser range finder 22 is obtained, as illustrated in the lower right part of FIG. 9, xi coordinates on an image plane of the obstacle on the imaging plane D relative to a center Pc of the imaging plane D as a reference can be obtained as following formula (3).

$$xi = f \times xc/zc \quad (3)$$

Here, f denotes the focal length of the polarization camera 21.

Furthermore, similarly, yi coordinates can be obtained by following formula (4).

$$yi = f \times yc/zc \quad (4)$$

As a result, the position of the obstacle on the imaging plane D can be identified.

In other words, the three-dimensional point coordinates $X_{Laser}$ (=[$x_1$, $y_1$, $z_1$]) detected by the laser range finder 22 are returned to the point coordinates $X_{Laser\_base}$ in the coordinate system serving as a reference on the basis of the light projection direction, and then converted into the three-dimensional point coordinates $X_{cam}$ [$x_c$, $y_c$, $z_c$]) in the coordinate system of the polarization camera 21. Moreover, the coordinates (xi, yi) on the imaging plane centered on the imaging plane D corresponding to the three-dimensional point coordinates $X_{cam}$ [$x_c$, $y_c$, $z_c$]) in the coordinate system of the polarization camera 21 are calculated on the basis of the focal length f of the polarization camera 21 by formulas (3) and (4).

<Environmental Mapping>

Next, environment mapping will be described with reference to FIG. 10.

The environment map generated by the environment mapping unit 321 by the environment mapping process is a so-called occupancy grid map.

Figure 10:
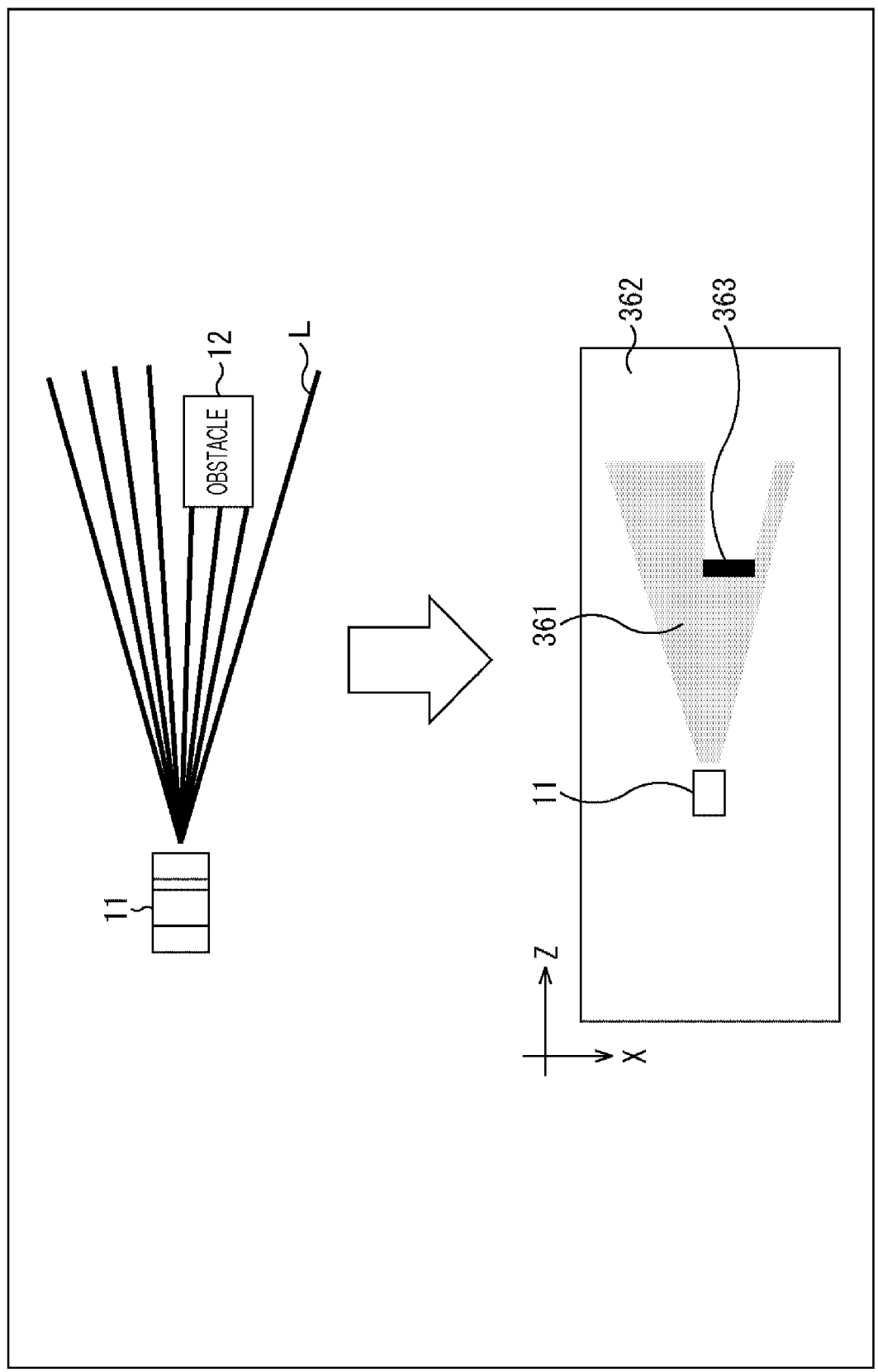
FIG. 10 is a diagram for explaining a method of generating an environment map.

In other words, in a case where the obstacle 12 is present ahead of the moving body 11 as illustrated in the upper part of FIG. 10, the environment mapping unit 321 generates an environment map as illustrated in the lower part of FIG. 10. Note that the upper part of FIG. 10 is a diagram of the moving body 11 as viewed from above, and illustrates that the laser range finder 22 is projecting the infrared light while radially changing the light projection direction L indicated by a straight line in the horizontal direction, and quantifying the position (direction) and distance for the obstacle 12.

The lower part of FIG. 10 illustrates an example of the environment map generated by the environment mapping unit 321 on the basis of the distance measurement result of the laser range finder 22 in the upper part of FIG. 10. An occupancy grid map, which is the environment map illustrated in the lower part of FIG. 10, is a map obtained by dividing a two-dimensional space by a grid of a predetermined size such that the reflected light is received by the laser range finder 22 for each cell divided by the grid in accordance with the principle of ray tracing, and indicating the distribution of the occupancy probabilities of the obstacle 12 depending on the presence or absence of the distance measurement result.

In more detail, in the environment map in the lower part of FIG. 10, a cell in a range for which there is no distance measurement result of the laser range finder 22 (a range outside the light projection direction) is illustrated in white and is set as a region 362 indicating that the situation is unknown.

Furthermore, for a cell in a range for which the reception of the reflected light from the obstacle 12 is not confirmed by the laser range finder 22 (a range in the light projection direction but for which the reflected light is not received), a region 361 in grey indicating that the range is a free space (a range in which an obstacle is not likely to be present) is set.

Moreover, for a cell in a range for which the reflected light is received and the distance is measured by the laser range finder 22, a region 363 in black indicating that the obstacle 12 is highly likely to be present is set.

Note that a cell in a range from the laser range finder 22 to the region 363 indicating that the obstacle 12 is highly likely to be present is set as the region 361 indicating that there is no obstacle (the region is a free space), and a cell in a range farther than the range set with the region 363 as viewed from the laser range finder 22 is set as the region 362 indicating that the situation is unknown because there is no distance measurement result.

<Case where Light Projection Direction from Laser Range Finder Inadvertently Reaches Road Surface>

As described above, it is premised that the light projection direction from the laser range finder 22 is controlled such that the normal direction of the flat plane forming the road surface is detected, the infrared light is projected in a direction orthogonal to the normal direction, and the distance is measured; however, there is a possibility that light is projected onto the road surface due to delay of control or the like.

Therefore, it may be determined whether or not the distance measurement position of the laser range finder 22 is on the road surface in the non-polarized image as the recognition result of the image recognition unit 304 such that, when the distance measurement position is assumed to be on a road surface, a cell in a range up to the distance measurement point, which is the road surface, is set as a free space even if the cell has the distance measurement result, and a cell after the distance measurement point is set as a region indicating that the situation is unknown.

Figure 11:
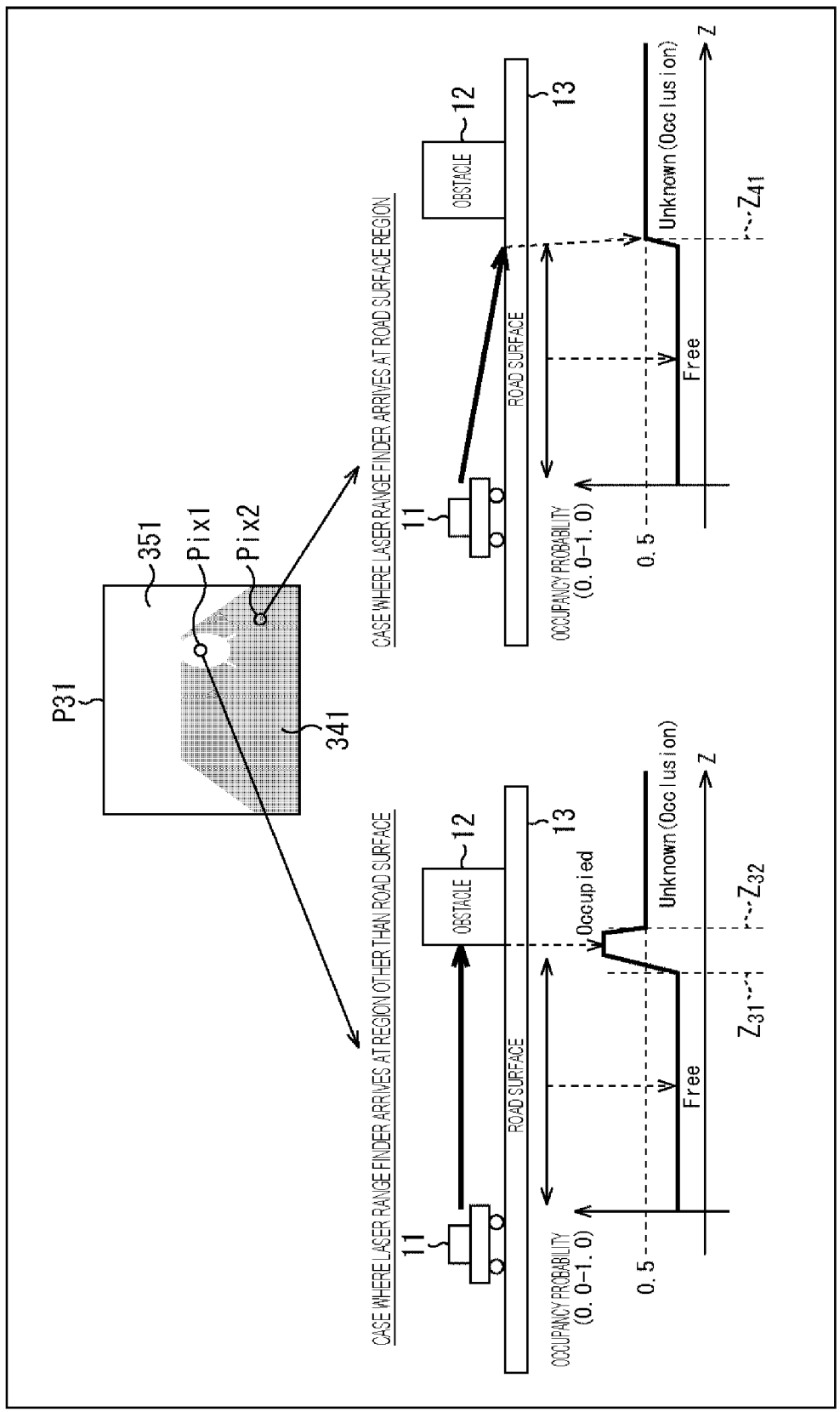
FIG. 11 is a diagram for explaining a method of generating an environment map.

In other words, in a case where the distance measurement point is assumed to be detected on the basis of the distance measurement result of the laser range finder 22 in a predetermined light projection direction, and the distance measurement point is in the region 2351 other than the road surface as indicated by a point Pix1 in a road surface detection result P31 illustrated in the upper part of FIG. 11, it is assumed that the obstacle 12 is detected.

Then, as illustrated in the lower left part of FIG. 11, the environment mapping unit 321 sets a cell belonging to a range from the moving body 11 to a distance Z31, which is a distance measurement point, as the region 361 (FIG. 10) of a free space (Free) where the obstacle 12 is not present. Furthermore, the environment mapping unit 321 sets a cell in a range from the distance Z31 to a distance Z32 (a range in the vicinity of where the distance measurement point is detected) as the region (Occupied) 363 (FIG. 10) where the obstacle 12 is highly likely to be present. Moreover, the environment mapping unit 321 sets a cell in a range after the distance Z32 as the region (Unknown (Occlusion)) 362 (FIG. 10) indicating that the region is an unknown region.

On the other hand, in a case where the distance measurement point is assumed to be detected on the basis of the distance measurement result of the laser range finder 22 in a predetermined light projection direction, and the distance measurement point is in the region 2341 of the road surface as indicated by a point Pix2 in the road surface detection result P31 illustrated in the upper part of FIG. 11, it is assumed that the obstacle 12 is not detected.

Then, as illustrated in the lower right part of FIG. 11, the environment mapping unit 321 sets a cell belonging to a range from the moving body 11 to a distance Z41, which is a distance measurement point, as the region 361 (FIG. 10) of a free space (Free) where the obstacle 12 is not present. Furthermore, the environment mapping unit 321 sets a cell in a range after the distance Z41 as the region (Unknown (Occlusion)) 362 (FIG. 10) indicating that the region is a region indicating that the situation is unknown.

Note that, in both of the lower left and right parts of FIG. 11, the light projection direction from the moving body 11 to the obstacle 12 on the road surface is indicated by arrows at the upper part. Furthermore, the lower part indicates the occupancy probability of the obstacle 12 set in cells corresponding to a distance Z in the light projection direction from the moving body 11 (the Z-axis direction in FIG. 11).

The occupancy probability has a value in the range of 0 to 1; the free space region (Free) 361 (FIG. 10) is represented as a value smaller than 0.5, the region (Occupied) 363 (FIG. 10) where the obstacle 12 is present is represented as a value greater than 0.5, and the unknown region (Unknown (Occlusion)) 362 is represented as 0.5. Moreover, a more accurate environment map may be generated by filtering the obtained occupancy probability map in a time direction using self-position information.

Such a process can prevent the obstacle 12 from being erroneously detected as being detected, even if the road surface is measured due to an incident such as delay of the control of the light projection direction of the laser range finder 22.

<Environment Map Generation Process>

Next, an environment map generation process will be described with reference to the flowchart in FIG. 12.

In step S11, the polarization camera 21 captures polarized images with a plurality of polarization directions of an area ahead of the moving body, for example, through filters for a plurality of polarization directions at a predetermined angle of view, and outputs the captured polarized images to the normal detection unit 301 and the image reconfiguration unit 303.

In step S12, the laser range finder 22 controls the angle control unit 22a on the basis of information on an optimum angle supplied from the laser range finder optimum angle calculation unit 305 in an immediately preceding process, and controls to adjust the light projection direction of the infrared light in the vertical direction to the optimum angle.

In step S13, the laser range finder 22 projects the infrared light while changing the light projection direction in the horizontal direction and, when the reflected light is received, calculates the reciprocation time of the infrared light from a difference between the time at a timing when the light is projected and the time at a timing when the reflected light is received. Additionally, the laser range finder 22 measures the distance to an obstacle that reflected the projected infrared light from the reciprocation time, and generates a three-dimensional point cloud constituted by information corresponding to the light projection direction and the detected distance to supply the generated three-dimensional point cloud to the pixel position calculation unit 306 and the environment mapping unit 321.

In step S14, as described with reference to FIG. 9, the pixel position calculation unit 306 converts coordinates in the coordinate system of the laser range finder 22 indicating the position of each point of the three-dimensional point cloud corresponding to the light projection direction by the laser range finder 22 and the distance to the detected obstacle 12, into coordinates in the coordinate system of the polarization camera 21 on the imaging plane (on the image) on which the polarization camera 21 performs imaging, and outputs the converted coordinates to the environment mapping unit 321.

In step S15, the image reconfiguration unit 303 reconfigures a non-polarized image by obtaining an average value for each pixel of the images with the plurality of polarization directions, and outputs the reconfigured image to the image recognition unit 304.

In step S16, as described with reference to FIG. 6, the normal detection unit 301 detects, for each pixel, a normal direction of a surface of a subject in the polarized images on the basis of the polarized images, and outputs the detected normal direction as a normal map to the image recognition unit 304 and the road surface flat plane normal detection unit 302.

In step S17, as described with reference to FIG. 6, the image recognition unit 304 recognizes a pixel belonging the road surface among subjects in the image, from among individual pixels of the non-polarized image on the basis of the non-polarized image and the normal map, and outputs information on the pixel belonging to the road surface, as a road surface detection result to the road surface flat plane normal detection unit 302.

In step S18, as described with reference to FIG. 7, the road surface flat plane normal detection unit 302 detects the normal direction of the road surface from the normal map and the road surface detection result, which is information on the pixel belonging to the road surface, and outputs the detected normal direction to the laser range finder optimum angle calculation unit 305.

In step S19, the laser range finder optimum angle calculation unit 305 calculates an optimum angle as the light projection direction of the laser range finder 22 on the basis of information on the normal direction of the road surface, and supplies the calculated optimum angle to the laser range finder 22. In more detail, the laser range finder optimum angle calculation unit 305 calculates, as the optimum angle, an angle at which the light projection direction of the laser range finder 22 in the vertical direction is orthogonal to the normal direction of the road surface. With this process, the light projection direction of the laser range finder 22 is set to the optimum angle in step S22 in a subsequent process.

In step S20, the environment mapping unit 321 executes the environment mapping process on the basis of the road surface detection result, the three-dimensional point cloud, and information on a pixel position corresponding to each point of the three-dimensional point cloud, and generates an environment map to output. Note that the environment mapping process will be described in detail with reference to the flowchart in FIG. 13.

In step S21, it is determined whether or not termination has been instructed; in a case where termination is not instructed, the process returns to step S11, and the processes in and after step S11 are repeated. Then, when termination is instructed in step S21, the process is terminated.

In other words, with the above processes, the normal direction of a flat plane forming the road surface obtained from polarized images with a plurality of polarization directions captured by the polarization camera 21 is obtained, the light projection direction of the laser range finder 22 is calculated with an angle orthogonal to the normal direction of the flat plane forming the road surface as an optimum angle, and the light projection direction of the laser range finder 22 is adjusted; consequently, it becomes possible to suppress erroneous detection such as a case where the light projection direction is displaced downward and the road surface is erroneously detected as an obstacle, and a case where the light projection direction is displaced upward and the obstacle 12 fails to be detected even though the obstacle 12 is present ahead.

As a result, it becomes possible to detect an obstacle with high accuracy and it thus becomes possible to generate a high accuracy environment map by the environment mapping process described later.

<Environment Mapping Process>

Next, the environment mapping process by the environment mapping unit 321 will be described with reference to the flowchart in FIG. 13.

In step S31, the environment mapping unit 321 sets one of the unprocessed light projection directions as a processing target light projection direction.

In step S32, the environment mapping unit 321 determines whether or not the distance has been measured, assuming that the reflected light is received and an obstacle is detected in the processing target light projection direction.

In step S32, in a case where it is assumed that the distance has been measured in the processing target light projection direction, the process proceeds to step S33.

In step S33, the environment mapping unit 321 determines whether or not a pixel on the non-polarized image corresponding to a point on a flat plane whose distance is detected in the processing target light projection direction is a pixel belonging to the road surface, on the basis of the road surface detection result.

In step S33, in a case where the pixel on the non-polarized image corresponding to the point on the flat plane whose distance is detected in the processing target light projection direction is not a pixel belonging to the road surface, the process proceeds to step S34.

In step S34, the environment mapping unit 321 sets, among grids set on the flat plane forming the road surface, a grid belonging to the processing target light projection direction from the laser range finder 22 up to the point whose distance is measured, as a region belonging to the free space, sets a grid near the point whose distance is measured, as a region indicating that an obstacle is highly likely to be present, and sets a cell after the point whose distance is measured, as a region indicating that the situation is unknown; thereafter, the process proceeds to step S37.

In other words, in this case, since it is assumed that the obstacle 12 is highly likely to be present at the point in the light projection direction, of which the distance is measured, the region of the cell is set for a cell present in the light projection direction, as illustrated in the lower left part of FIG. 11.

On the other hand, in step S33, in a case where the pixel on the non-polarized image corresponding to the point on the flat plane whose distance is detected in the processing target light projection direction is a pixel belonging to the road surface, the process proceeds to step S35.

In step S35, the environment mapping unit 321 sets, among grids belonging to the processing target light projection direction, a cell up to the point whose distance is measured, as a region belonging to the free space, and sets a cell after the point whose distance is measured, as a region indicating that the situation is unknown; thereafter the process proceeds to step S37.

In other words, in this case, since the point in the light projection direction, of which the distance is measured, is on the road surface and the obstacle 12 is not likely to be present, the region of the cell is set for a cell present in the light projection direction, as illustrated in the lower right part of FIG. 11.

Moreover, in step S32, in a case where the distance has not been measured in the processing target light projection direction, the process proceeds to step S36.

In step S36, the environment mapping unit 321 sets all the cells belonging to the processing target light projection direction as a region indicating that the situation is unknown; thereafter, the process proceeds to step S37.

In other words, in this case, the reflected light is not received at all in the light projection direction, and neither the obstacle nor the road surface is detected; accordingly, all the cells belonging to the region in the light projection direction are set as a region indicating that the situation is unknown.

In step S37, the environment mapping unit 321 determines whether or not there is an unprocessed light projection direction. In a case where there is an unprocessed light projection direction, the process returns to step S31. In other words, the processes from step S31 to step S37 are repeated until no unprocessed light projection direction is found.

Then, in a case where, for all the light projection directions, each belonging cell is set as one of the free space, an obstacle, or an unknown region, and it is assumed in step S37 that there is no unprocessed light projection direction, the process proceeds to step S38.

In step S38, the environment mapping unit 321 completes the environment map, for example, as illustrated in the lower part of FIG. 10 from the information on the belonging regions of all the cells to output the completed environment map, and terminates the process.

With the above process, it is determined whether or not a point on a flat plane whose distance is measured by the laser range finder 22 is an obstacle on the basis of whether or not the point is on the road surface, and a region to which each cell belongs is set; accordingly, it is possible to suppress erroneous detection as if an obstacle is detected despite detecting the road surface.

<Timing Chart of Environment Map Generation Process>

Figure 14:
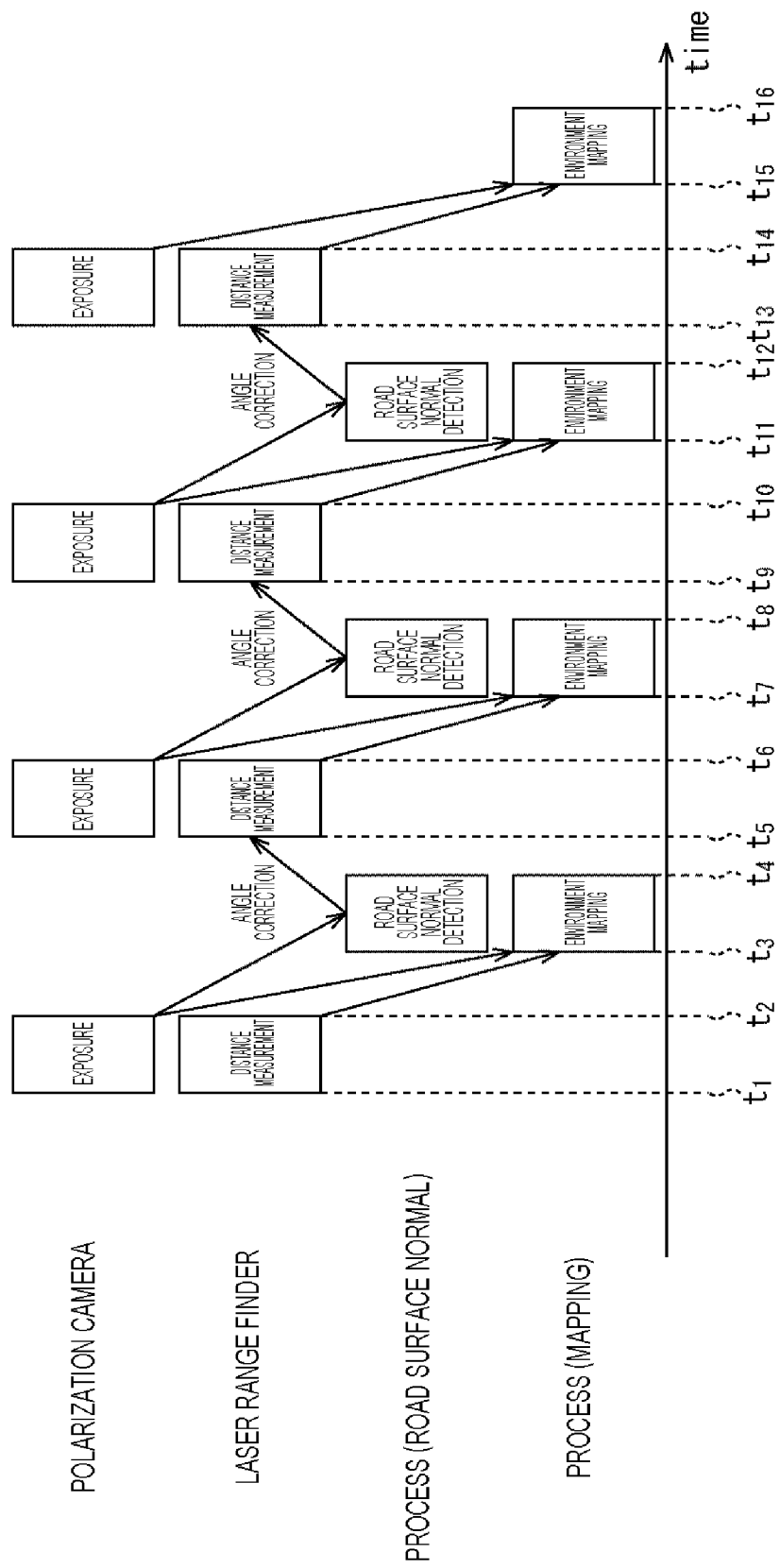
FIG. 14 is a flowchart for explaining an environment mapping process.

Next, the environment map generation process will be described with reference to the timing chart in FIG. 14.

Figure 12:
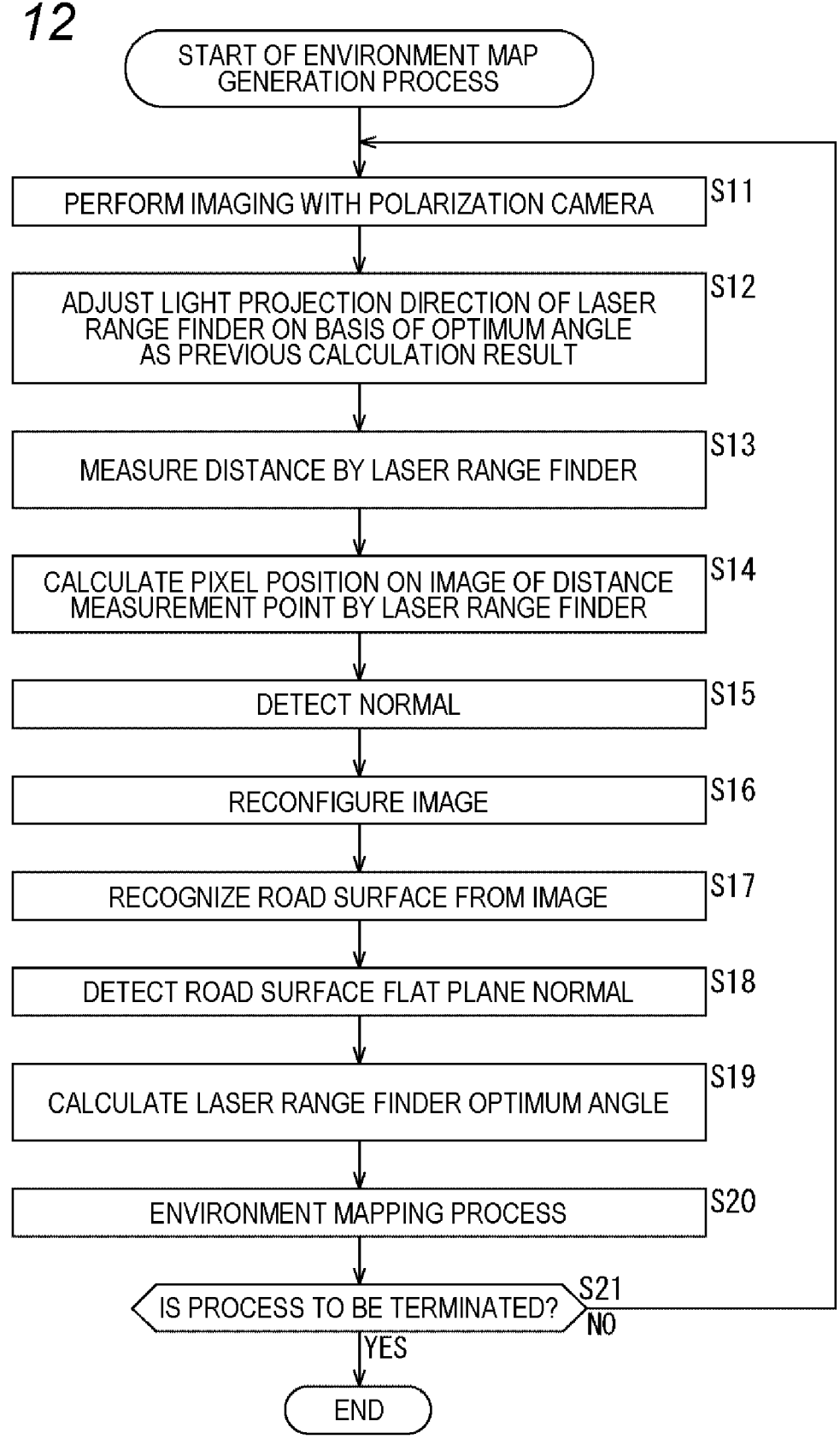
FIG. 12 is a flowchart for explaining an environment map generation process.

In other words, from time t1 to time t2, exposure is conducted and polarized images with a plurality of polarization directions are captured by the process in step S11 of FIG. 12 in the polarization camera 21; additionally, distance measurement for the obstacle is conducted for each light projection direction by the processes in step S12 to S14 of FIG. 12 in the laser range finder 22.

From time t3 to time t4, the road surface normal is detected, and additionally the optimum angle of the laser range finder 22 is calculated by the processes in steps S15 to S19 of FIG. 12 in the normal detection unit 301 to the image recognition unit 304; moreover, an environment map is generated using the polarized images and the distance measurement result for the obstacle by the environment mapping process in step S20 of FIG. 12 in the environment mapping unit 321.

From time t5 to time t6, processes similar to the processes from time t1 to time t2 are conducted, but the light projection direction is corrected on the basis of information on the optimum angle of the laser range finder 22.

From time t7 to time t8, processes similar to the processes from time t3 to time t4 are conducted, and similar processes are repeated thereafter.

As a result, since the optimum angle of the light projection direction of the laser range finder 22 is repeatedly calculated and corrected, it is possible to suppress erroneous detection such as a case where the light projection direction is displaced downward and the road surface is erroneously detected as an obstacle, and a case where an obstacle is not detected even though there is an obstacle because no obstacle is present in the light projection direction.

Figure 13:
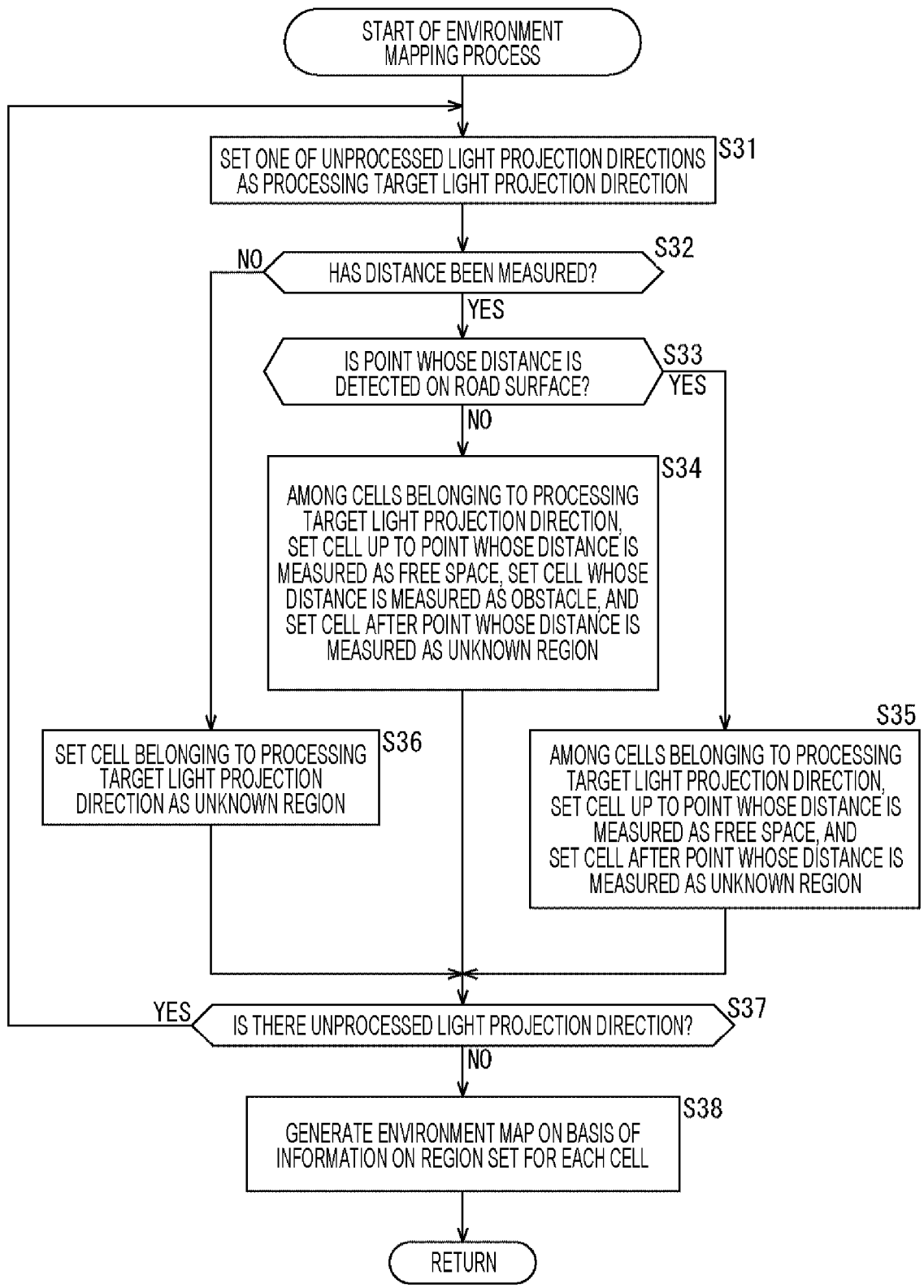
FIG. 13 is a timing chart for explaining the environment map generation process.

Note that the timing chart in FIG. 13 depicts that the process in step S11 of FIG. 12 and the processes in steps S12 to S14 are processed at the same timing, and the processes in S15 to S19 and the process in step S20 are processed at the same timing, while, in the flowchart in FIG. 12, these processes are described as being processed at different timings. However, the flowchart in FIG. 12 is merely described such that the processes proceed in series for the sake of convenience and, in practice, the processes are conducted in accordance with the timing chart in FIG. 13, for example, by conducting parallel processing.

Furthermore, in the above description, it is premised that the road surface has a flat plane without unevenness; however, even if the road surface is uneven, since a dominant normal direction among normal directions in units of pixels in a range assumed as the road surface is used, the normal direction of the road surface can be treated as an average normal direction including unevenness.

Moreover, in the above description, although the flat plane forming the road surface with respect to the moving direction of moving body 11 has been explained, if a flat plane forms the movable region in which the moving body attempts to move, the flat plane is not necessarily a road surface.

Additionally, in the above description, the normal direction of the road surface has been explained by taking an example of obtaining a dominant normal direction among the normal directions of pixels for which the attribute of the road surface is set, using the normal map obtained from the polarized images with a plurality of polarization directions; however, the normal direction may be obtained by another method as long as the normal direction is obtained. For example, the normal direction may be obtained using information from a known map, or the normal direction may be obtained using a stereo camera.

2. First Application Example

In the above description, the range of the imaging angle of view of the polarization camera 21 in the horizontal direction and the range of the light projection direction of the laser range finder 22 in the horizontal direction are fixed centering on the front ahead; however, these ranges may be changed according to the steering angle of the steering of the moving body 11.

Figure 15:
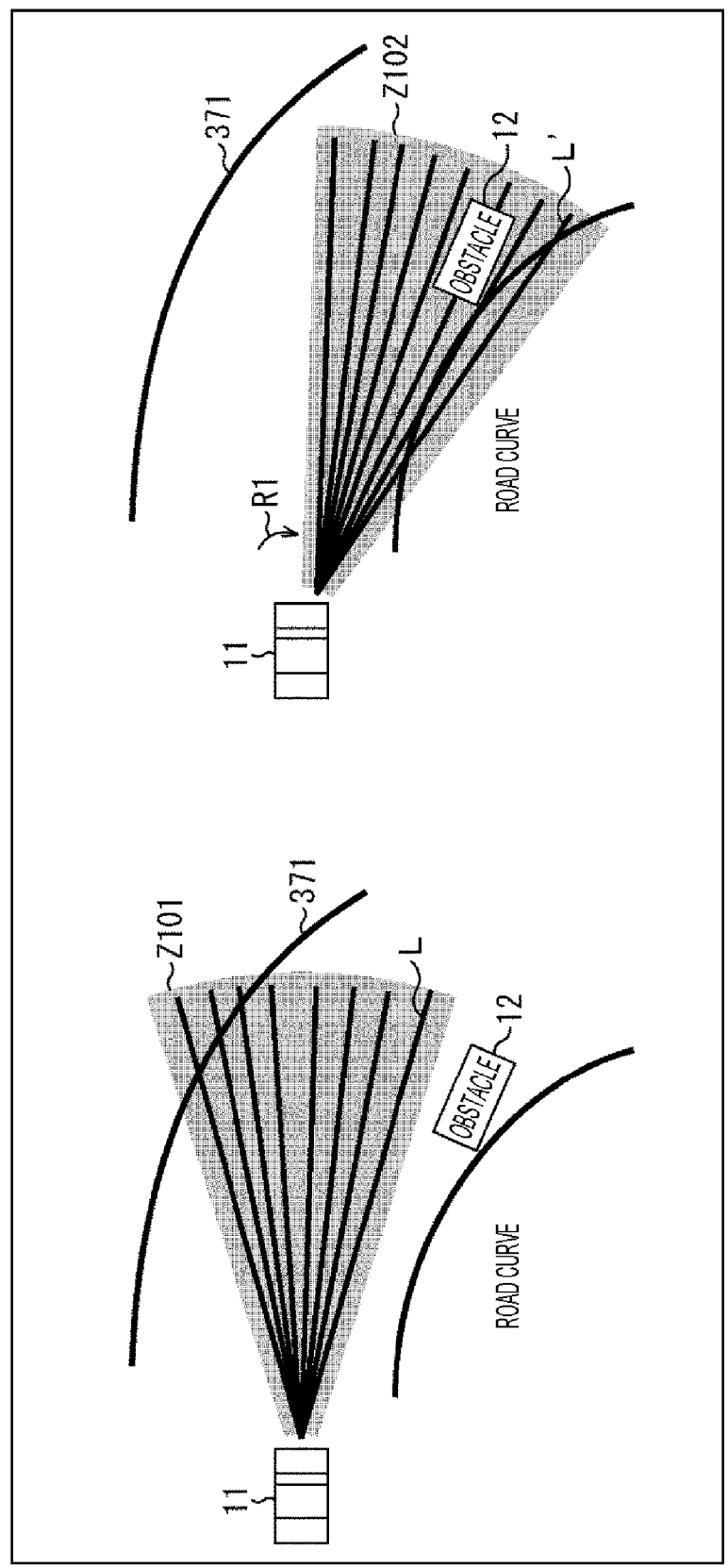
FIG. 15 is a diagram for explaining a first application example.

In other words, in a case where, as illustrated in the left part of FIG. 15, the range of the imaging angle of view of the polarization camera 21 in the horizontal direction and the range of the light projection direction of the laser range finder 22 in the horizontal direction are fixed centering on the front ahead as indicated by a range 2101, if a road 371 is curved downward of FIG. 15 (to the right direction with respect to the moving direction) and the obstacle 12 is present at the right end as viewed from the moving body 11, the obstacle 12 will be out of the detection range when the moving body 11 moves in the right direction of FIG. 15; in this case, the obstacle 12 cannot be detected until the moving body 11 approaches the obstacle 12.

Therefore, as illustrated in the right part of FIG. 15, a rotation R11 may be made in the right direction so as to constitute a range 2102 in line with the shift of the steering when the moving body 11 turns along the road 371. This configuration makes it possible to promptly detect an obstacle.

3. Second Application Example

In the above description, an example in which the laser range finder 22 has the light projection direction in only one direction with respect to the vertical direction has been illustrated, but a plurality of light projection directions with respect to the vertical direction may be set.

Figure 16:
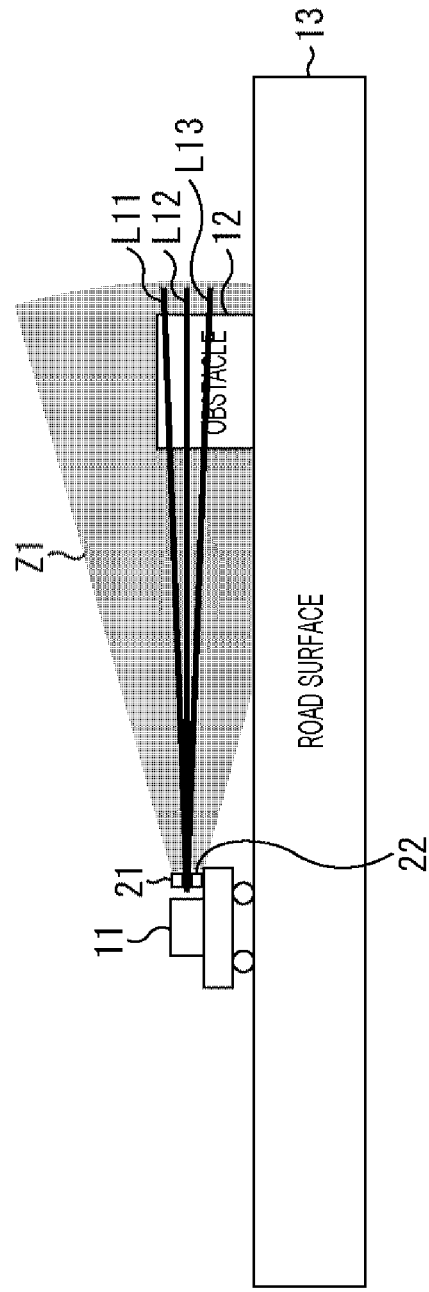
FIG. 16 is a diagram for explaining a second application example.

In other words, as illustrated in FIG. 16, three directions may be set so as to constitute light projection directions L11 to L13 with respect to the vertical direction. In the case of FIG. 16, light projection units (not illustrated) of the laser range finder 22 may be provided in three directions in the vertical direction such that the obstacle 12 is searched for while the light projection units rotate in the horizontal direction at the same time, or the search may be divided into three times in the vertical direction by time division.

Furthermore, a plurality of directions other than the three directions may be searched in the vertical direction.

4. Example of Execution by Software

Incidentally, a series of the above-described processes can be executed by hardware but also can be executed by software. In a case where the series of the processes is executed by software, a program constituting the software is installed from a recording medium to a computer built into dedicated hardware or a computer capable of executing various types of functions when installed with various types of programs, for example, a general-purpose computer.

Figure 17:
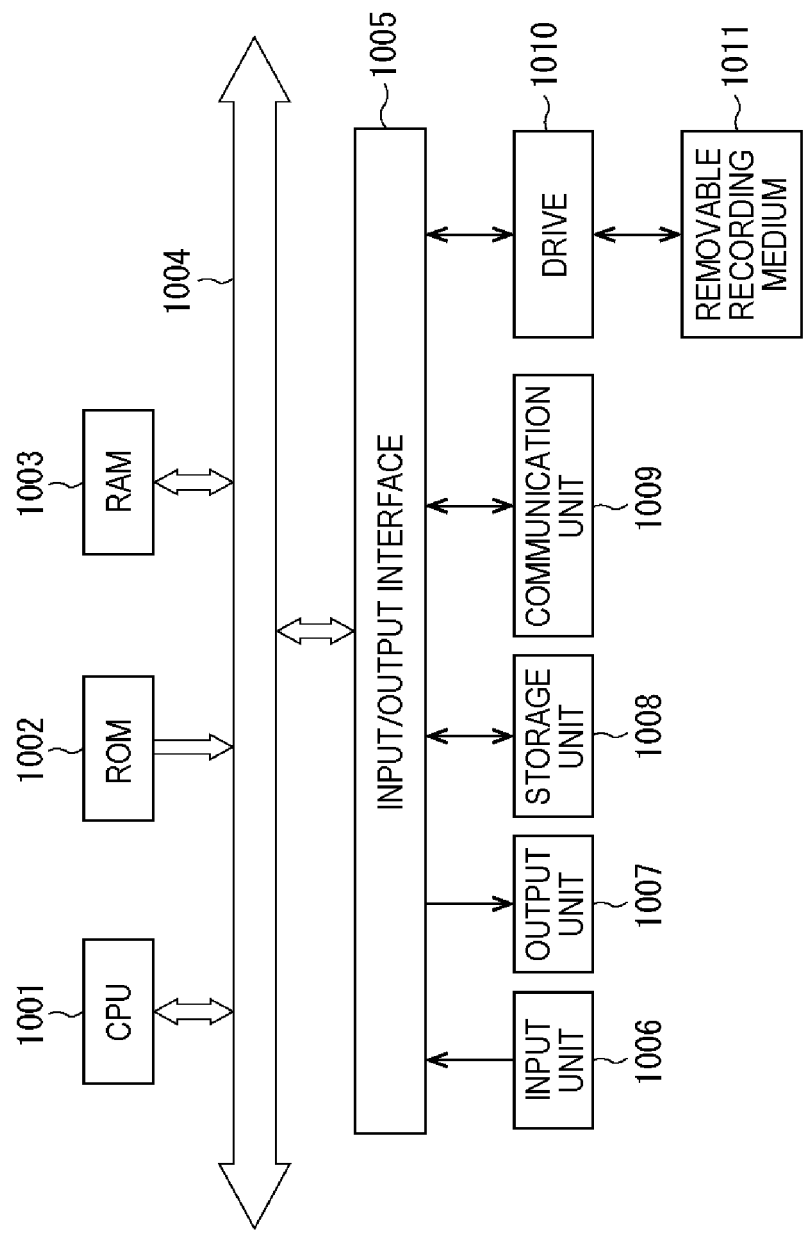
FIG. 17 is a diagram for explaining a configuration example of a general-purpose personal computer.

FIG. 17 illustrates a configuration example of a general-purpose personal computer. This personal computer includes a built-in central processing unit (CPU) 1001. An input/output interface 1005 is connected to the CPU 1001 via a bus 1004. A read only memory (ROM) 1002 and a random access memory (RAM) 1003 are connected to the bus 1004.

An input unit 1006 including an input device such as a keyboard and a mouse with which the user inputs an operation command, an output unit 1007 that outputs a processing operation screen and an image of a processing result to a display device, a storage unit 1008 including a hard disk drive that stores a program and various types of data, and a communication unit 1009 including a local area network (LAN) adapter to execute communication processing via a network typified by the Internet are connected to the input/output interface 1005. Additionally, a magnetic disk (including a flexible disk), an optical disk (including a compact disc-read only memory (CD-ROM) and a digital versatile disc (DVD)), a magneto-optical disk (including a mini disc (MD)), or a drive 1010 that reads and writes data from and to a removable medium 1011 such as a semiconductor memory is connected thereto.

The CPU 1001 executes various types of processing in accordance with a program stored in the ROM 1002 or a program read from the removable medium 1011 such as a magnetic disk, an optical disk, a magneto-optical disk, or a semiconductor memory to be installed to the storage unit 1008 and then loaded to the RAM 1003 from the storage unit 1008. Meanwhile, data necessary for the CPU 1001 to execute various types of processing and the like is stored in the RAM 1003 as appropriate.

In the computer having the configuration as described above, for example, the aforementioned series of the processes is performed in such a manner that the CPU 1001 loads a program stored in the storage unit 1008 to the RAM 1003 via the input/output interface 1005 and the bus 1004 to execute.

For example, the program executed by the computer (CPU 1001) can be provided by being recorded in the removable medium 1011 serving as a package medium or the like. Furthermore, the program can be provided via a wired or wireless transfer medium such as a local area network, the Internet, or digital satellite broadcasting.

In the computer, the program can be installed to the storage unit 1008 via the input/output interface 1005 by mounting the removable medium 1011 in the drive 1010. Furthermore, the program can be installed to the storage unit 1008 via a wired or wireless transfer medium when received by the communication unit 1009. As an alternative manner, the program can be installed to the ROM 1002 or the storage unit 1008 in advance.

Note that, the program executed by the computer may be a program in which the processes are performed along the time series in accordance with the order described in the present description, or alternatively, may be a program in which the processes are performed in parallel or at a necessary timing, for example, when called.

Additionally, the CPU 1001 in FIG. 17 implements the function of the automated driving control unit 110 in FIG. 4. Furthermore, the storage unit 1008 in FIG. 17 implements the storage unit 109 in FIG. 4.

In addition, in the present description, a system refers to a collection of a plurality of constituent members (e.g., apparatuses and modules (parts)) and whether or not all the constituent members are arranged within the same cabinet is not regarded as important. Accordingly, a plurality of apparatuses accommodated in separate cabinets so as to be connected to one another via a network and one apparatus of which a plurality of modules is accommodated within one cabinet are both deemed as systems.

Note that the embodiments according to the present disclosure are not limited to the aforementioned embodiments and various modifications can be made without departing from the scope of the present disclosure.

For example, the present disclosure can employ a cloud computing configuration in which one function is divided and allocated to a plurality of apparatuses so as to be processed in coordination thereamong via a network.

Furthermore, the respective steps described in the aforementioned flowcharts can be executed by a plurality of apparatuses each taking a share thereof as well as executed by a single apparatus.

Moreover, in a case where a plurality of processes is included in one step, the plurality of processes included in one step can be executed by a plurality of apparatuses each taking a share thereof as well as executed by a single apparatus.

Note that the present disclosure can be also configured as described below.

<1> A control apparatus including:

an object detection unit that projects light while changing a direction along a same plane to also receive reflected light of the light, and detects a direction and a distance in which the light is reflected, according to a difference time between a time of light projection and a time of light reception; and a movable region normal detection unit that detects a normal direction of a flat plane in a three-dimensional space forming a movable region of a moving body, in which the object detection unit controls a light projection direction of light so as to change a direction along a plane orthogonal to the normal direction.

<2> The control apparatus according to <1>, further including a polarization camera that captures polarized images with a plurality of polarization directions, in which the movable region normal detection unit detects a normal direction of a flat plane forming a movable region of a moving body, from the polarized images.

<3> The control apparatus according to <2>, further including:

a normal direction detection unit that detects a normal direction of a surface of a subject in the polarized images in units of pixels;

a reconfiguration unit that reconfigures a non-polarized image from a plurality of the polarized images; and an attribute setting unit that determines, for each pixel of the non-polarized image, whether or not the subject has an attribute of the movable region, in which the movable region normal detection unit detects, as a normal direction of a flat plane forming the movable region, the normal direction dominant in a region of a pixel whose attribute is set as the movable region by the attribute setting unit among the pixels of the non-polarized image.

<4> The control apparatus according to <3>, in which the attribute setting unit sets an attribute of the subject as the movable region for each pixel of the non-polarized image whose absolute value of an inner product of a perpendicular direction and a normal vector that has been detected is greater than a predetermined value.

<5> The control apparatus according to <3>, further including an environment mapping unit that generates an environment map on the basis of information on the direction and the distance in which the light is reflected, which are detected by the object detection unit.

<6> The control apparatus according to <5>, in which the environment mapping unit generates an environment map on the basis of information on whether or not each pixel of the non-polarized image has an attribute of the movable region, and information on the direction and the distance in which the light is reflected.

<7> The control apparatus according to <6>, in which the environment mapping unit generates the environment map by:

for a direction in which each pixel of the non-polarized image is not in the movable region, and the reflected light is detected, setting a space up to reaching a distance at which the reflected light is detected, as a free space;

setting a space in a vicinity of the distance at which the reflected light is detected, as a region indicating that an obstacle is highly likely to be present; and setting a space after the distance at which the reflected light is detected, as an unknown region, and for a direction in which each pixel of the non-polarized image is in the movable region, and the reflected light is detected, setting a space up to the distance at which the reflected light is detected, as a free space; and setting a space after the distance at which the reflected light is detected, as an unknown region.

<8> The control apparatus according to <5>, in which the environment map includes an occupancy grid map.

<9> The control apparatus according to <2>, further including a coordinate system integration unit that integrates a coordinate system indicating a position whose distance is detected by the object detection unit into a coordinate system of the polarized images captured by the polarization camera.

<10> The control apparatus according to <1>, in which the object detection unit includes light detection and ranging or laser imaging detection and ranging (LiDAR).

<11> The control apparatus according to <1>, in which the movable region includes a road surface.

<12> A control method including:

projecting light while changing a direction along a same plane to also receive reflected light of the light, and detecting a direction and a distance in which the light is reflected, according to a difference time between a time of light projection and a time of light reception; and detecting a normal direction of a flat plane in a three-dimensional space forming a movable region of a moving body, on the basis of a polarized image, in which in the detecting a direction and a distance in which the light is reflected, a light projection direction of light is controlled so as to change a direction along a plane orthogonal to the normal direction.

<13> A program for causing a computer to execute a process including:

an object detection unit that projects light while changing a direction along a same plane to also receive reflected light of the light, and detects a direction and a distance in which the light is reflected, according to a difference time between a time of light projection and a time of light reception; and a movable region normal detection unit that detects a normal direction of a flat plane in a three-dimensional space forming a movable region of a moving body, on the basis of a polarized image, in which the object detection unit controls a light projection direction of light so as to change a direction along a plane orthogonal to the normal direction.

<14> A moving body including:

an object detection unit that projects light while changing a direction along a same plane to also receive reflected light of the light, and detects a direction and a distance in which the light is reflected, according to a difference time between a time of light projection and a time of light reception;

a movable region normal detection unit that detects a normal direction of a flat plane in a three-dimensional space forming a movable region of the moving body, on the basis of a polarized image;

an environment mapping unit that generates an environment map on the basis of information on the direction and the distance in which the light is reflected, which are detected by the object detection unit;

a planning unit that generates an action plan on the basis of the environment map; and a control unit that controls a motion of the moving body on the basis of the generated action plan, in which the object detection unit controls a light projection direction of light so as to change a direction along a plane orthogonal to the normal direction.

REFERENCE SIGNS LIST

11 Moving body
12 Obstacle
21 Polarization camera
22 Laser range finder
31 Road surface
32, 32-1, 32-2 Three-dimensional structure
33 Sky
34 Person
51 Boundary pixel (pixel)
61 Intersection point (point)
61-1, 61-2, 62 Intersection point group
102 Data acquisition unit
112 Automated driving control unit
141 Moving body external information detection unit
152 Situation recognition unit
301 Normal detection unit
302 Road surface flat plane normal detection unit
303 Image reconfiguration unit
304 Image recognition unit
305 Laser range finder optimum angle calculation unit
306 Pixel position calculation unit
321 Environment mapping unit

The invention claimed is:

1. A control apparatus comprising:

a light detector that projects light while changing a direction along a same plane, receives reflected light of the projected light, and detects a direction and a distance in which the projected light is reflected, according to a difference time between a time of light projection and a time of light reception;

a polarization camera that captures a polarized image; and processing circuitry configured to detect, based on a plurality of the polarized images, each normal direction of each surface of each object in the polarized image in units of pixels, reconfigure a non-polarized image from the plurality of the polarized images, determine, for each pixel of the non-polarized image, whether or not each of the object has an attribute of a movable region in a three-dimensional space that is movable by a moving body, and detect, as a normal direction of a flat plane in the movable region, a normal direction that is dominant in a region of pixels whose attribute is determined as the movable region among the pixels of the non-polarized image, wherein the light detector controls a light projection direction of the projected light so as to change the light projection direction along a plane orthogonal to the normal direction of the flat plane forming the movable region.

2. The control apparatus according to claim 1, wherein the processing circuitry sets the attribute of the object as the movable region for each pixel of the non-polarized image whose absolute value of an inner product of a perpendicular direction and a normal vector that has been detected is greater than a predetermined value.

3. The control apparatus according to claim 1, wherein the processing circuitry is configured to generate an environment map on a basis of information on the direction and the distance in which the projected light is reflected, which are detected by the light detector.

4. The control apparatus according to claim 3, wherein the environment map includes an occupancy grid map.

5. The control apparatus according to claim 3, wherein the processing circuitry generates an environment map on a basis of information on whether or not each pixel of the non-polarized image has the attribute of the movable region, and information on the direction and the distance in which the projected light is reflected.

6. The control apparatus according to claim 5, wherein the processing circuitry generates the environment map by:

for a direction in which each pixel of the non-polarized image is not in the movable region, and the reflected light is detected, setting a space up to reaching a distance at which the reflected light is detected, as a free space;

setting a space in a vicinity of the distance at which the reflected light is detected, as a region indicating that an obstacle is highly likely to be present; and setting a space after the distance at which the reflected light is detected, as an unknown region, and for a direction in which each pixel of the non-polarized image is in the movable region, and the reflected light is detected, setting a space up to the distance at which the reflected light is detected, as a free space; and setting a space after the distance at which the reflected light is detected, as an unknown region.

7. The control apparatus according to claim 1, wherein the processing circuitry is configured to integrate a coordinate system indicating a position whose distance is detected by the light detector into a coordinate system of the polarized image captured by the polarization camera.

8. The control apparatus according to claim 1, wherein the light detector includes light detection and ranging or laser imaging detection and ranging (LiDAR).

9. The control apparatus according to claim 1, wherein the movable region includes a road surface.

10. The control apparatus according to claim 1, wherein the moving body is a vehicle.

11. The control apparatus according to claim 1, wherein the flat plane forms a road surface.

12. The control apparatus according to claim 11, wherein the processing circuitry is configured to determine, for each pixel of the non-polarized image, whether or not each of the object has an attribute of the road surface using machine learning.

13. A control method comprising:
projecting light while changing a direction along a same plane, receiving reflected light of the projected light, and detecting a direction and a distance in which the projected light is reflected, according to a difference time between a time of light projection and a time of light reception;
capturing, using a polarization camera, a polarized image;
detecting, using processing circuitry, based on a plurality of the polarized images, each normal direction of each surface of each object in the polarized image in units of pixels;
reconfiguring, using the processing circuitry, a non-polarized image from the plurality of the polarized images;
determining, using the processing circuitry, for each pixel of the non-polarized image, whether or not each of the object has an attribute of a movable region in a three-dimensional space that is movable by a moving body;
detecting, using the processing circuitry, as a normal direction of a flat plane in the movable region, a normal direction that is dominant in a region of pixels whose attribute is determined as the movable region among the pixels of the non-polarized image; and
controlling a light projection direction of the projected light so as to change the light projection direction along a plane orthogonal to the normal direction of the flat plane forming the movable region.

14. A non-transitory computer readable medium including executable instructions, which when executed by a computer cause the computer to execute a control method, the method comprising:
controlling a light detector to project light while changing a direction along a same plane, receive reflected light of the projected light, and detect a direction and a distance in which the projected light is reflected, according to a difference time between a time of light projection and a time of light reception;
controlling a polarization camera to capture a polarized image;
detecting based on a plurality of the polarized image, each normal direction of each surface of each object in the polarized image in units of pixels;
reconfiguring a non-polarized image from the plurality of the polarized images;
determining, for each pixel of the non-polarized image, whether or not each of the object has an attribute of a movable region in a three-dimensional space that is movable by a moving body;
detecting, as a normal direction of a flat plane in the movable region, a normal direction that is dominant in a region of pixels whose attribute is determined as the movable region among the pixels of the non-polarized image; and
controlling the light detector to control a light projection direction of the projected light so as to change the light projection direction along a plane orthogonal to the normal direction of the flat plane forming the movable region.

15. A moving body comprising:
a light detector that projects light while changing a direction along a same plane, receives reflected light of the projected light, and detects a direction and a distance in which the projected light is reflected, according to a difference time between a time of light projection and a time of light reception; and
processing circuitry configured to
detect a normal direction of a flat plane in a movable region in a three-dimensional space that is movable by the moving body, on a basis of a polarized image,
generate an environment map on a basis of information on the direction and the distance in which the projected light is reflected, which are detected by the light detector,
generate an action plan on a basis of the environment map, and
control a motion of the moving body on a basis of the generated action plan, wherein
the light detector controls a light projection direction of the projected light so as to change the light projection direction along a plane orthogonal to the normal direction of the flat plane forming the movable region.

* * * * *